(12) United States Patent
Markovic et al.

(10) Patent No.: US 8,933,884 B2
(45) Date of Patent: Jan. 13, 2015

(54) TRACKING GROUPS OF USERS IN MOTION CAPTURE SYSTEM

(75) Inventors: Relja Markovic, Seattle, WA (US);
Stephen G. Latta, Seattle, WA (US);
Kevin A. Geisner, Mercer Island, WA (US); David Hill, Bellevue, WA (US);
Darren A. Bennett, Seattle, WA (US);
David C. Haley, Jr., Dallas, TX (US);
Brian S. Murphy, Seattle, WA (US);
Shawn C. Wright, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 12/688,793

(22) Filed: Jan. 15, 2010

(65) Prior Publication Data

US 2011/0175809 A1    Jul. 21, 2011

(51) Int. Cl.
| | | |
|---|---|---|
| *G06F 3/033* | (2013.01) | |
| *G06F 3/01* | (2006.01) | |
| *A63F 13/20* | (2014.01) | |
| *A63F 13/40* | (2014.01) | |
| *G06F 3/038* | (2013.01) | |

(52) U.S. Cl.
CPC ............. *G06F 3/017* (2013.01); *A63F 13/06* (2013.01); *A63F 13/10* (2013.01); *G06F 3/038* (2013.01); *A63F 2300/1093* (2013.01); *A63F 2300/6045* (2013.01); *A63F 2300/6072* (2013.01); *A63F 2300/8017* (2013.01); *A63F 2300/8023* (2013.01)
USPC ............................................ 345/158; 463/36

(58) Field of Classification Search
CPC ..... G06F 3/011; G06F 3/0425; G06F 3/0304; G06F 3/0346; G06F 3/038
USPC ................................. 345/157–162; 463/1–47
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |

(Continued)

FOREIGN PATENT DOCUMENTS

| | | |
|---|---|---|
| CN | 101254344 B | 6/2010 |
| EP | 0583061 A2 | 2/1994 |
| EP | 0872808 A1 | 10/1998 |
| JP | 08044490 A1 | 2/1996 |
| WO | 93/10708 A1 | 6/1993 |

(Continued)

OTHER PUBLICATIONS

Wang et al, Face Tracking as an Augmented Input in Video Games: Enhancing Presence, Role-playing and Control: ACM CHI Proceedings, Selecting and Tracking, vol. 2, pp. 1097-1106, Apr. 2006.*

(Continued)

*Primary Examiner* — Dorothy Harris
(74) *Attorney, Agent, or Firm* — Gregg Wisdom; Judy Yee; Micky Minhas

(57) ABSTRACT

In a motion capture system, a unitary input is provided to an application based on detected movement and/or location of a group of people. Audio information from the group can also be used as an input. The application can provide real-time feedback to the person or group via a display and audio output. The group can control the movement of an avatar in a virtual space based on the movement of each person in the group, such as in a steering or balancing game. To avoid a discontinuous or confusing output by the application, missing data can be generated for a person who is occluded or partially out of the field of view. A wait time can be set for activating a new person and deactivating a currently-active person. The wait time can be adaptive based on a first detected position or a last detected position of the person.

12 Claims, 20 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,210,604 A | 5/1993 | Carpenter |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,365,266 A | 11/1994 | Carpenter |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,508,731 A | 4/1996 | Kohorn |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,836 A * | 1/1998 | Norton et al. ............ 463/36 |
| 5,704,837 A | 1/1998 | Iwasaki et al. |
| 5,715,834 A | 2/1998 | Bergamasco et al. |
| 5,793,382 A * | 8/1998 | Yerazunis et al. ............ 345/474 |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,993,314 A | 11/1999 | Dannenberg et al. |
| 5,995,649 A | 11/1999 | Marugame |
| 6,005,548 A * | 12/1999 | Latypov et al. ............ 345/156 |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,046 B1 | 7/2001 | Waters et al. |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,171,025 B2 | 1/2007 | Rui |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 * | 8/2007 | Luck et al. ............ 382/103 |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |

(56) References Cited

U.S. PATENT DOCUMENTS

| | | | |
|---|---|---|---|
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,737,944 B2* | 6/2010 | Harrison et al. | 345/156 |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0019258 A1* | 2/2002 | Kim et al. | 463/36 |
| 2002/0041327 A1* | 4/2002 | Hildreth et al. | 348/42 |
| 2002/0075305 A1 | 6/2002 | Beaton et al. | |
| 2003/0079218 A1 | 4/2003 | Goldberg et al. | |
| 2003/0109305 A1* | 6/2003 | Gavin et al. | 463/31 |
| 2004/0224761 A1* | 11/2004 | Nishimura | 463/33 |
| 2004/0248632 A1* | 12/2004 | French et al. | 463/4 |
| 2006/0010400 A1 | 1/2006 | Dehlin et al. | |
| 2006/0135237 A1* | 6/2006 | Tsuda | 463/9 |
| 2006/0252541 A1* | 11/2006 | Zalewski et al. | 463/36 |
| 2006/0258457 A1 | 11/2006 | Brigham | |
| 2007/0015558 A1* | 1/2007 | Zalewski et al. | 463/1 |
| 2007/0032297 A1* | 2/2007 | Hara | 463/32 |
| 2007/0218994 A1* | 9/2007 | Goto et al. | 463/36 |
| 2008/0026838 A1 | 1/2008 | Dunstan et al. | |
| 2008/0152191 A1 | 6/2008 | Fujimura et al. | |
| 2008/0166022 A1* | 7/2008 | Hildreth | 382/107 |
| 2008/0220878 A1* | 9/2008 | Michaelis | 463/42 |
| 2009/0087032 A1 | 4/2009 | Boyd et al. | |
| 2009/0122146 A1* | 5/2009 | Zalewski et al. | 348/169 |
| 2009/0141933 A1 | 6/2009 | Wagg | |
| 2009/0143141 A1 | 6/2009 | Wells | |
| 2009/0221368 A1 | 9/2009 | Yen et al. | |
| 2009/0244309 A1 | 10/2009 | Maison | |
| 2010/0037273 A1 | 2/2010 | Dressel et al. | |
| 2010/0093435 A1 | 4/2010 | Glaser et al. | |
| 2010/0201693 A1 | 8/2010 | Caplette et al. | |
| 2010/0207874 A1 | 8/2010 | Yuxin et al. | |
| 2010/0303289 A1 | 12/2010 | Polzin et al. | |
| 2011/0118032 A1* | 5/2011 | Zalewski | 463/39 |

FOREIGN PATENT DOCUMENTS

| | | |
|---|---|---|
| WO | 97/17598 A1 | 5/1997 |
| WO | 99/44698 A1 | 9/1999 |
| WO | WO2004026138 A1 | 4/2004 |
| WO | WO 2007/074403 A2 | 7/2007 |
| WO | WO2009059065 | 5/2009 |
| WO | WO 2011/087887 A2 | 7/2011 |

OTHER PUBLICATIONS

Merriam-Webster Dictionary, definition of tangible, downloaded from http://www.merriam-webster.com/dictionary/tangible on Sep. 3, 2012.*

Li et al, "Fast Video Target Tracking in the Presence of Occlusion and Camera Motion Blur", Proc of SPIE vol. 6567, 656707, (2007), pp. 1-9.*

Yang et al, "Game-theoretic multiple target tracking", Proc. of ICCV, (2007), pp. 1-8.*

International Search Report & The Written Opinion of the International Searching Authority dated Sep. 8, 2011, International Patent Application No. PCT/US2010/062646.

Tracking Body Parts of Multiple People for Multi-Person Multimodal Interface—Published Date: Nov. 30, 2006 http://perso.rd.francetelecom.fr/bernier/publications/carbini_HCI05.pdf.

Tracking Multiple People with a Multi-Camera System—Published Date: Apr. 18, 2008 http://www.dcs.qmul.ac.uk/~sgg/papers/chang-gong-iccvOMOT01.pdf.

Detecting and Tracking Multiple Users in the Proximity of Interactive Tabletops—Published Date: Nov. 2, 2008 http://www.aece.ro/archive/2008/2/2008_2_11.pdf?zoom_highlightsub=distributed+control.

iGameFloor—A Platform for Co-Located Collaborative Games—Published Date: Jun. 13-15, 2007 http://delivery.acm.org/10.1145/1260000/1255061/p64-gronbak.pdf?key1=1255061&key2=9516216521&coll=GUIDE&dl=GUIDE&CFID=58851730&CFTOKEN=77619017.

Tracking Body Parts of Multiple People: A New Approach—Published Date: 2001 http://ieeexplore.ieee.org/stamp/stamp.jsp?tp=&arnumber=937979&isnumber=20302.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

(56) References Cited

OTHER PUBLICATIONS

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Notice of Allowance and Fee(s) Due dated Apr. 14, 2011, United States Patent & Trademark Office, U.S. Appl. No. 12/847,133, filed Jul. 30, 2010.

English Abstract of PCT Publication No. WO2004026138 published on Apr. 1, 2004.

Maynes-Aminzade et al., "Techniques for Interactive Audience Participation," 2002, Proceedings of the 4th IEEE International Conference on Multimodal Interfaces (ICMI '02), p. 257.

Suhardi, I., "Large Group Games with a Motion-and Orientation-Sensing Game Controller," Aug. 2008, University Bremen, 117 pages.

Reeves, et al., "Designing for crowds," 2010, NordiCHI '10 Proceedings of the 6th Nordic Conference on Human-Computer Interaction: Extending Boundaries, pp. 1-10.

Bregler et al., "Squidball: An Experiment in Large-Scale Motion Capture and Game Design," 2005, Proceedings of INTETAIN, 10 pages.

Yu, et al., "Collaborative Tracking of Multiple Targets," 2004, Proceedings of 2004 IEEE Computer Society Conference on Computer Vision and Pattern Recognition (CVPR'04), 8 pages.

Chinese Office Action dated Oct. 17, 2013, Chinese Patent Application No. 201110024965.0.

Responce to Office Action dated Oct. 22, 2013, Chinese Patent Application No. 201110024965.0.

English translation of the Summary of the Response to 3rd OA, Amended Claims and Pending Claims dated Oct. 22, 2013, Chinese Patent Application No. 201110024965.0.

Chinese Office Action dated Jun. 24, 2013, Cinese Patent Application No. 201110024965.0.

Response to Office Action dated Jun. 27, 2013, Chinese Patent Application No. 201110024965.0.

English translation of the Summary of the Response to 2nd OA and Amended Claims dated Jun. 27, 2013, Chinese Patent Application No. 201110024965.0.

Chinese Office Action dated Feb. 16, 2013, Chinese Patent Application No. 201110024965.0.

Response to Office Action dated Feb. 26, 2013, Chinese Patent Application No. 201110024965.0.

English translation of Summary of Response to Office Action and Amended Claims dated Feb. 26, 2013, Chinese Patent Application No. 201110024965.0.

* cited by examiner

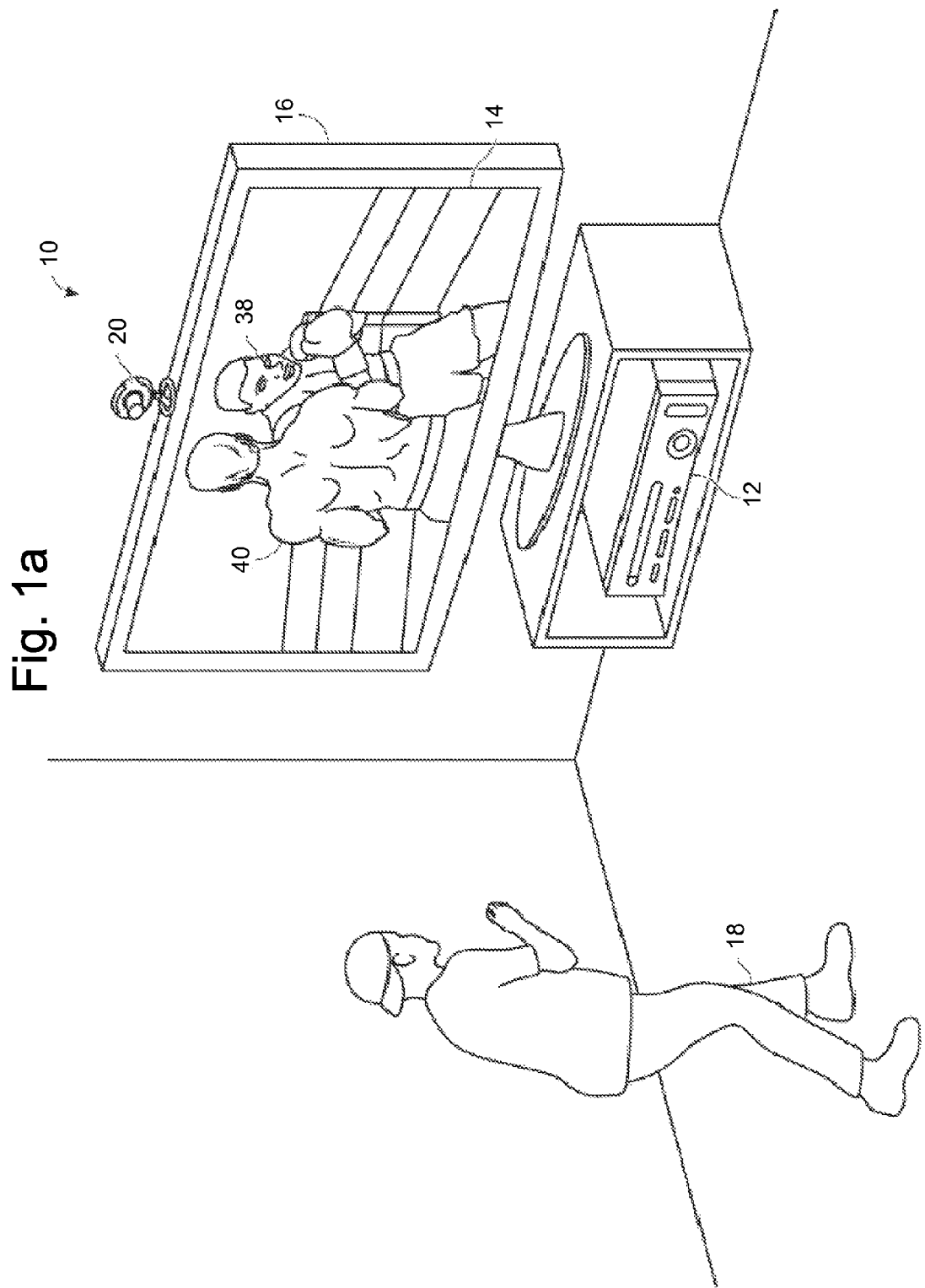

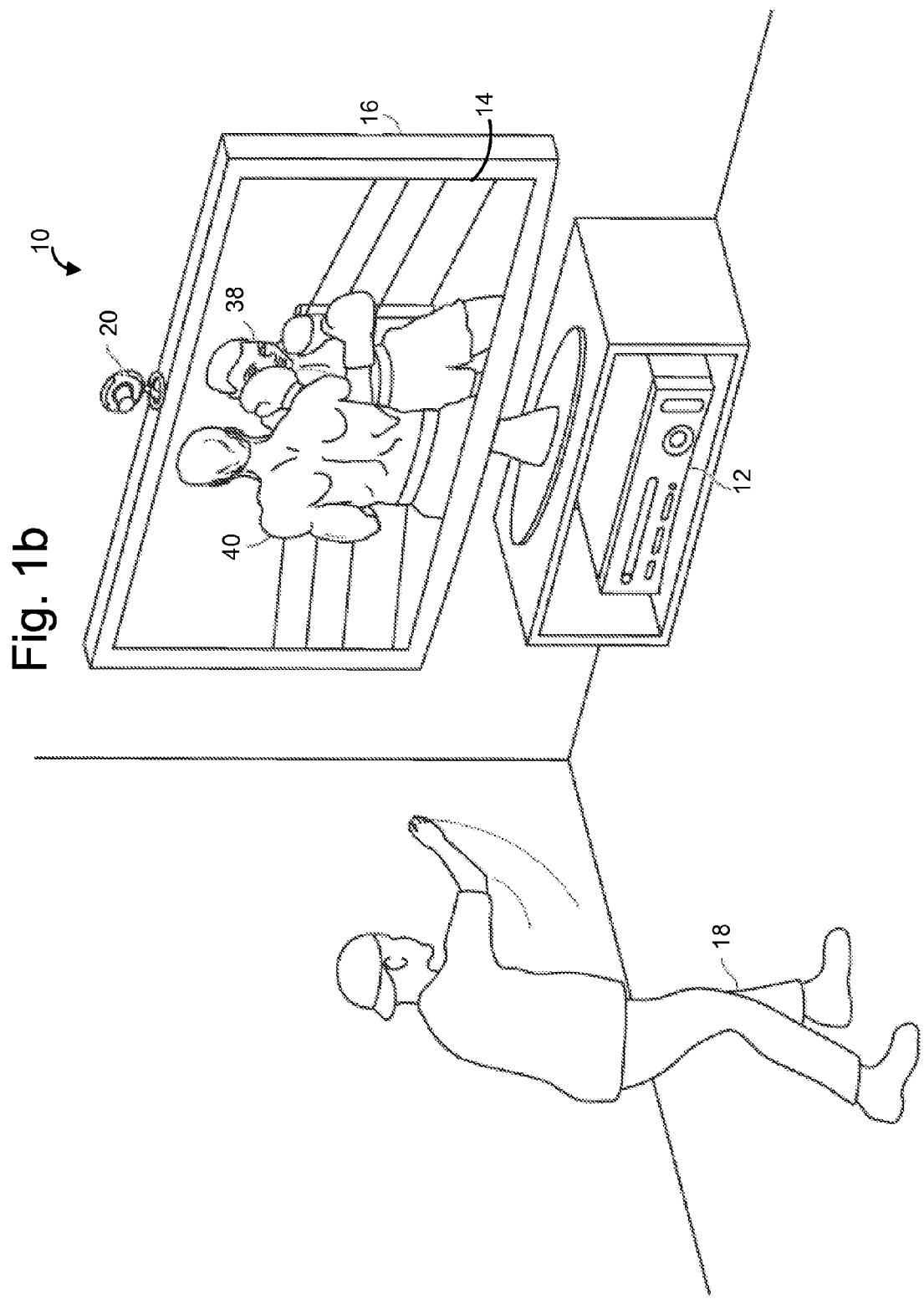

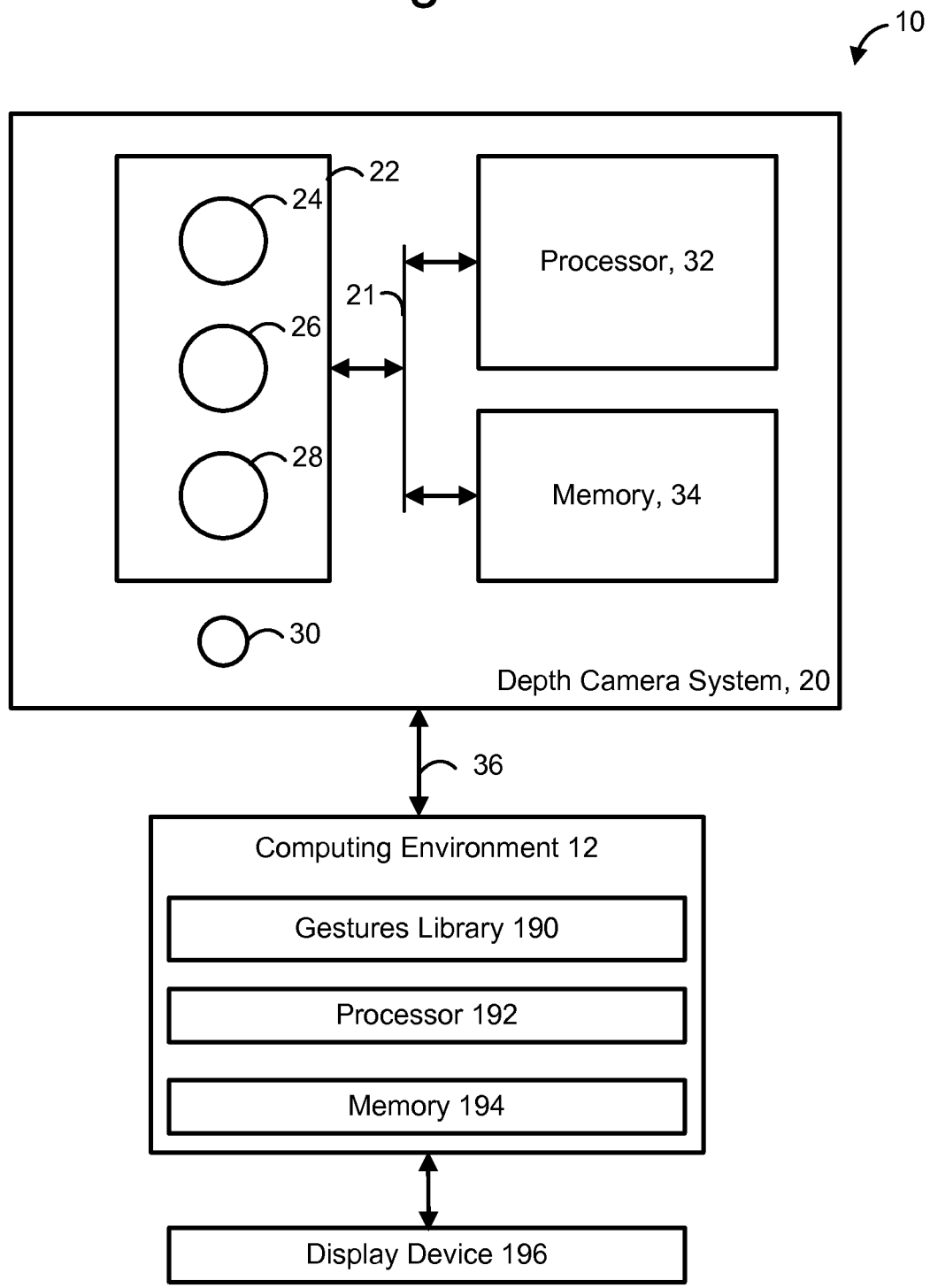

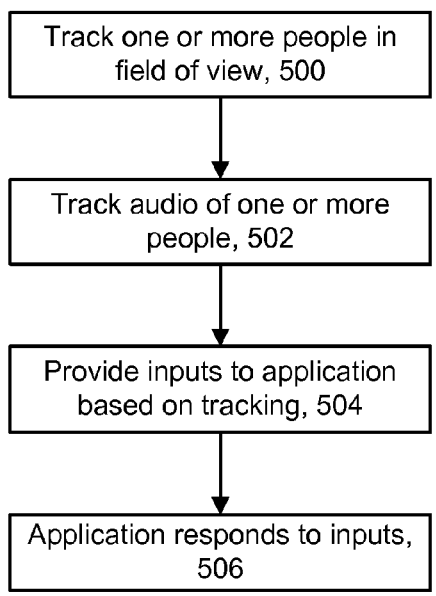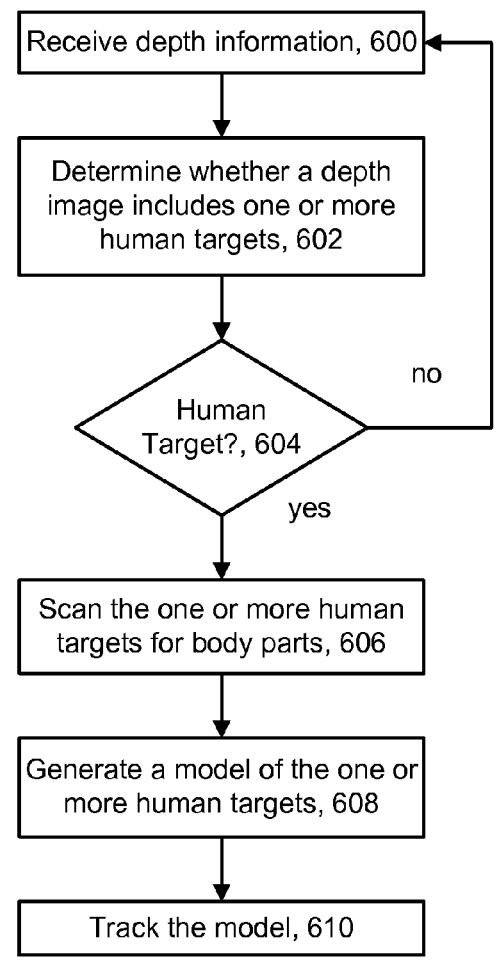

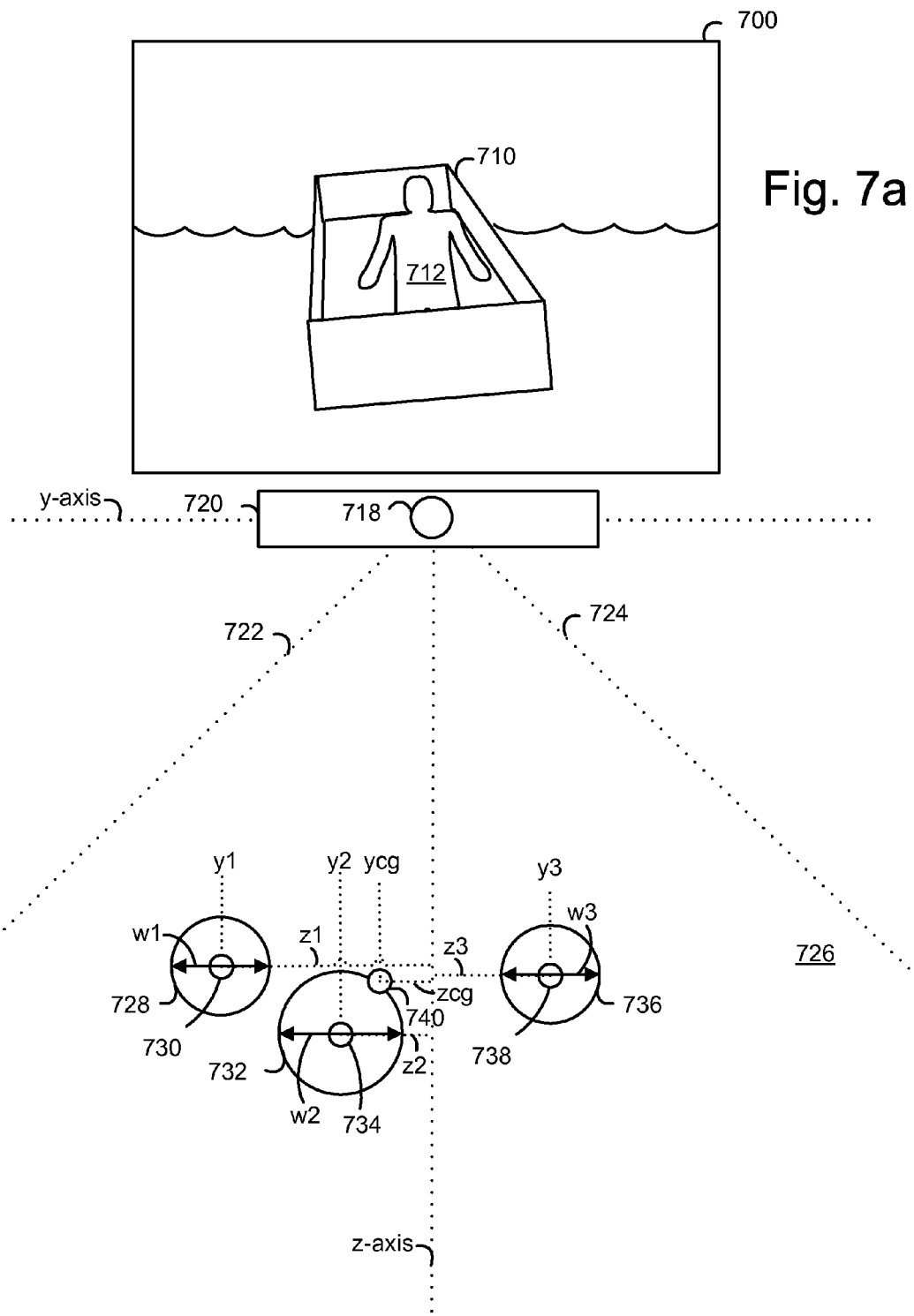

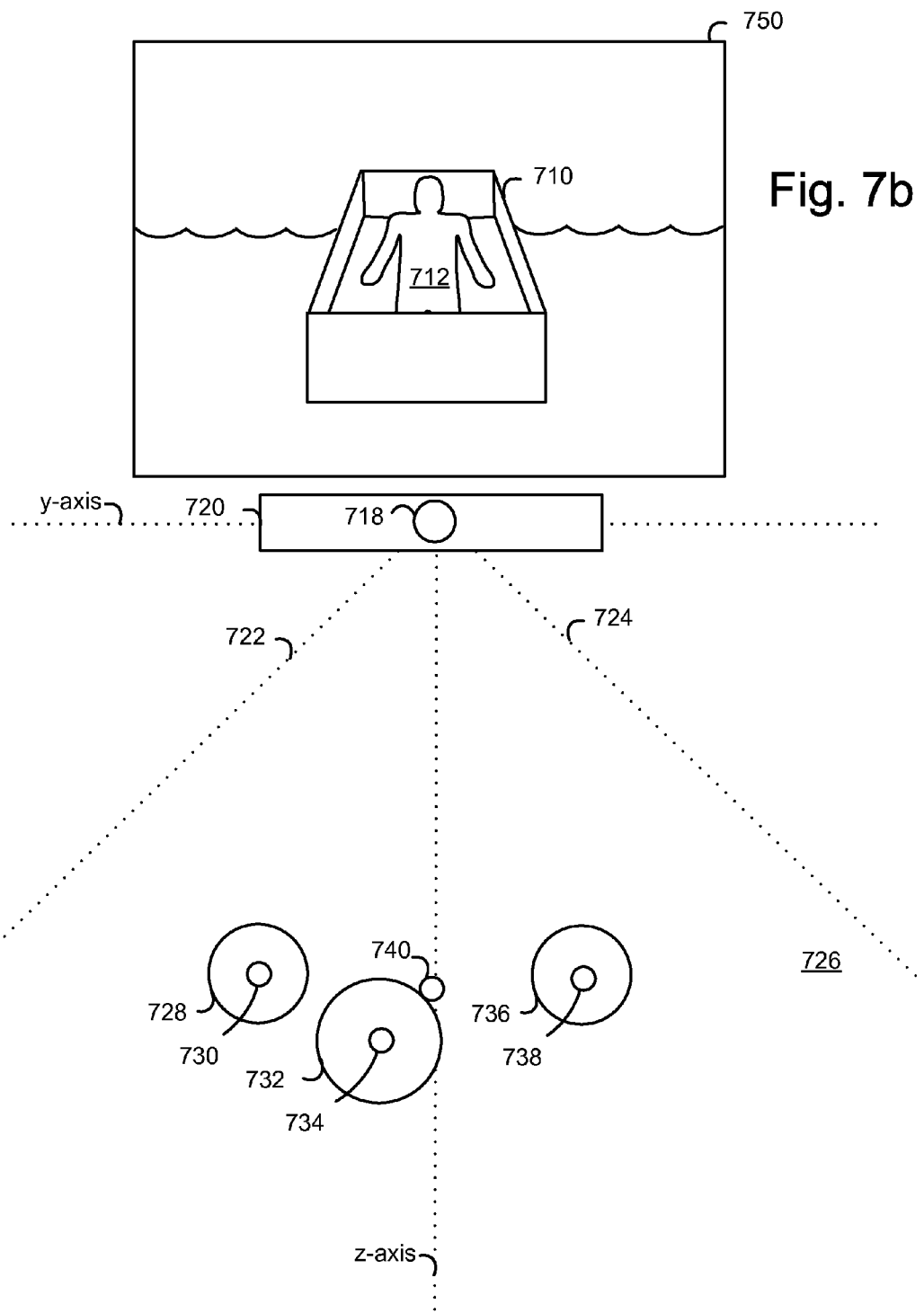

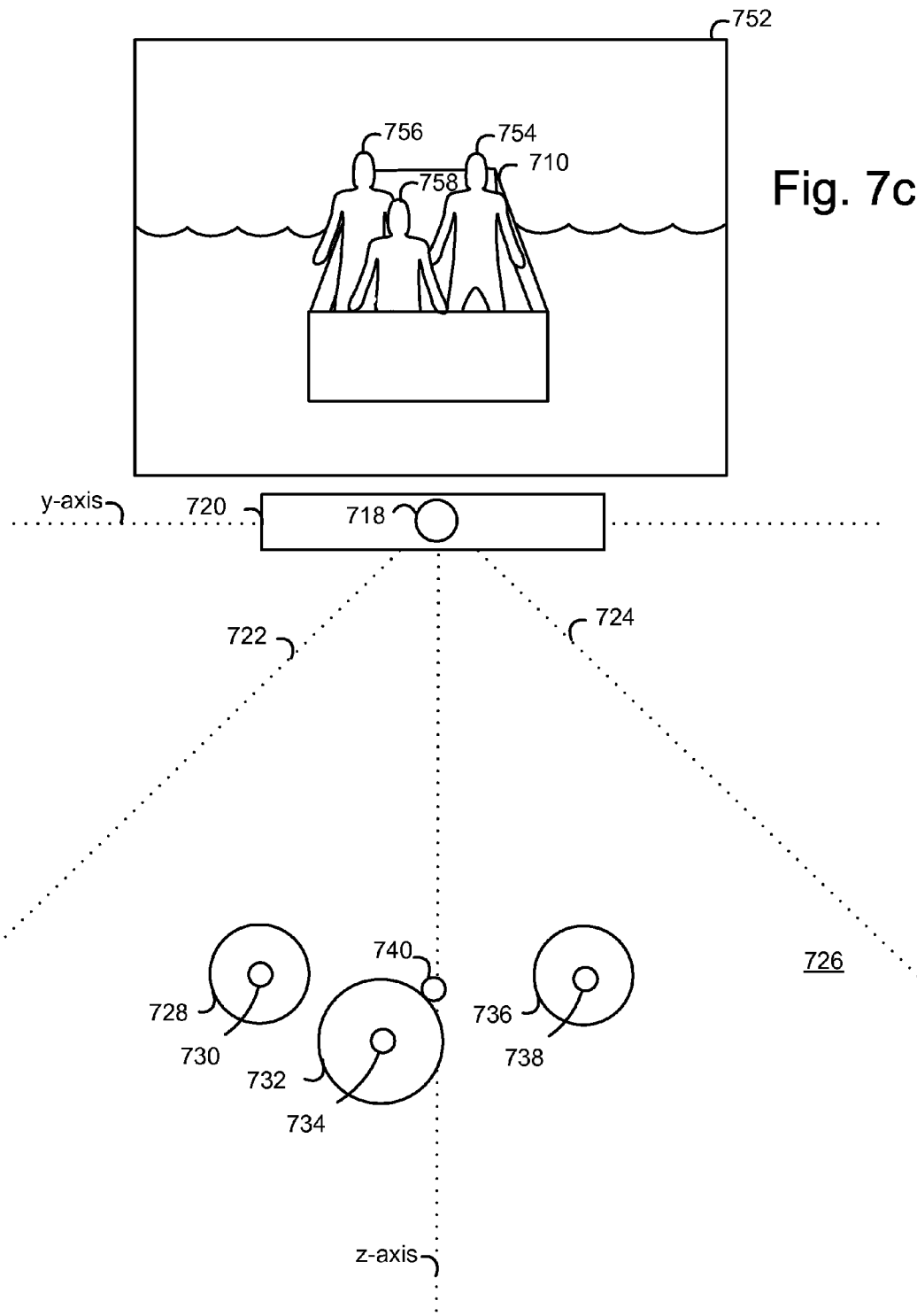

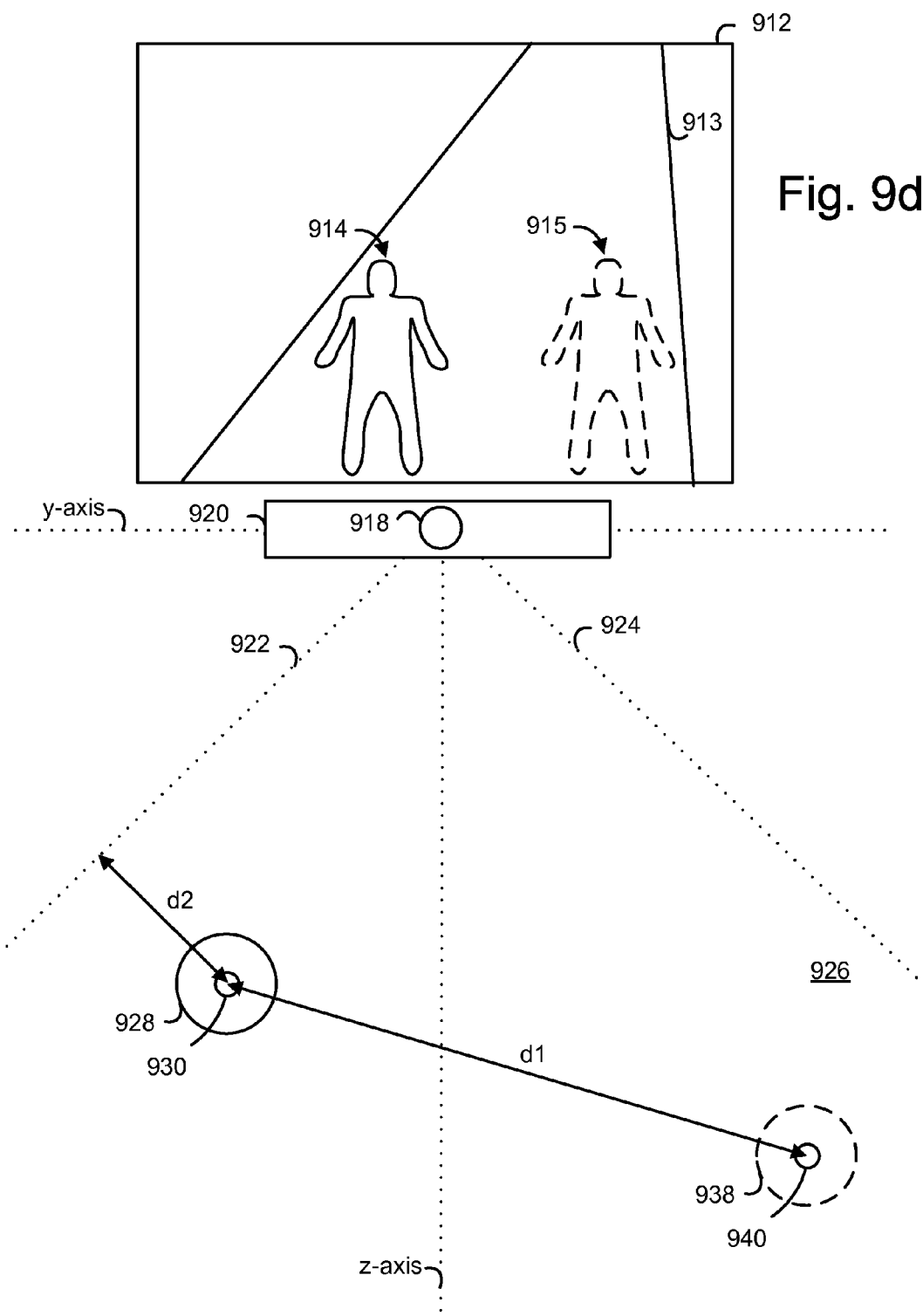

TRACKING GROUPS OF USERS IN MOTION CAPTURE SYSTEM

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a 3 d human skeletal model and used to create an animated character or avatar. Optical systems, including those using visible and invisible, e.g., infrared, light, use cameras to detect the presence of a human in a field of view. Markers can be placed on the human to assist in detection, although markerless systems have also been developed. Some systems use inertial sensors which are carried by, or attached to, the human to detect movement. For example, in some video game applications, the user holds a wireless controller which can detect movement while playing a game. However, further refinements are needed which allow individuals and groups to interact more naturally with an application.

SUMMARY

A processor-implemented method, motion capture system and tangible computer readable storage are provided for tracking a group of users to provide a unitary input to an application.

In a motion capture system, movements of one or more people in a field of view are tracked and used as inputs to an application. In one approach, a unitary input is provided to the application based on the movement and/or location of a group of people. Audio information from the group can also be used as an input. The application can provide real-time feedback to the person or group via a display and audio output. For example, a group can control the movement of an avatar in a virtual space based on the movement of each person in the group. In an example implementation, the group input is used to steer or balance an avatar in a gaming application. In another aspect, missing data is generated for a person who is occluded or partially out of the field of view. In a further aspect, techniques are used to minimize the risk of a discontinuous output by the application.

In one embodiment, a processor-implemented method for tracking multiple people in a motion capture system includes tracking a group which comprises peoples' bodies in a field of view of the motion capture system. The tracking includes detecting the peoples' bodies in the field of view. The people can be detected individually. Based on the tracking, movement of the group is determined as a unitary entity based on movement of the people in the group. For example, the movement of a blob or mass which encompasses the group can be identified with identifying the individual members of the group. Or, each person can be identified individually. A representative point location can be determined for each person, and movement of the group can be determined based on the collective movements of the representative point locations of each person. The method further includes providing inputs to an application which are based on the movement of the group as the unitary entity. The application displays a virtual space on a display, and updates the display in real-time based on the inputs, so that the group controls the application based on the movement of the group as the unitary entity.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIGS. 1a and 1b depict an example embodiment of a motion capture system in which a user interacts with an application which simulates a boxing match.

FIG. 2 depicts an example block diagram of the motion capture system 10 of FIG. 1a.

FIG. 3 depicts an example block diagram of a computing environment that may be used in the motion capture system of FIG. 1a.

FIG. 4 depicts another example block diagram of a computing environment that may be used in the motion capture system of FIG. 1a.

FIG. 5 depicts a method for enabling one or more people to interact with a motion capture system.

FIG. 6a depicts an example method for tracking movement of one or more people as set forth in step 500 of FIG. 5.

FIG. 6e depicts an example skeletal model of a person as set forth in step 608 of FIG. 6a.

FIG. 6f depicts another example skeletal model of a person as set forth in step 608 of FIG. 6a.

FIG. 6g depicts an example model of a group of people as set forth in step 608 of FIG. 6a.

FIG. 7a depicts an example display and physical space, where a size and representative point location of each person is determined, and a representative point location for the group is determined and used to steer an avatar.

FIG. 7b depicts an example display and physical space based on FIG. 7a after the representative point location for the group moves.

FIG. 7c depicts an example display and physical space based on FIG. 7b when a separate avatar is provided for each player.

FIG. 9d depicts an example display and physical space based on FIGS. 9b and 9c, where movement and location of a person in physical space is evaluated.

DETAILED DESCRIPTION

Figure 3:
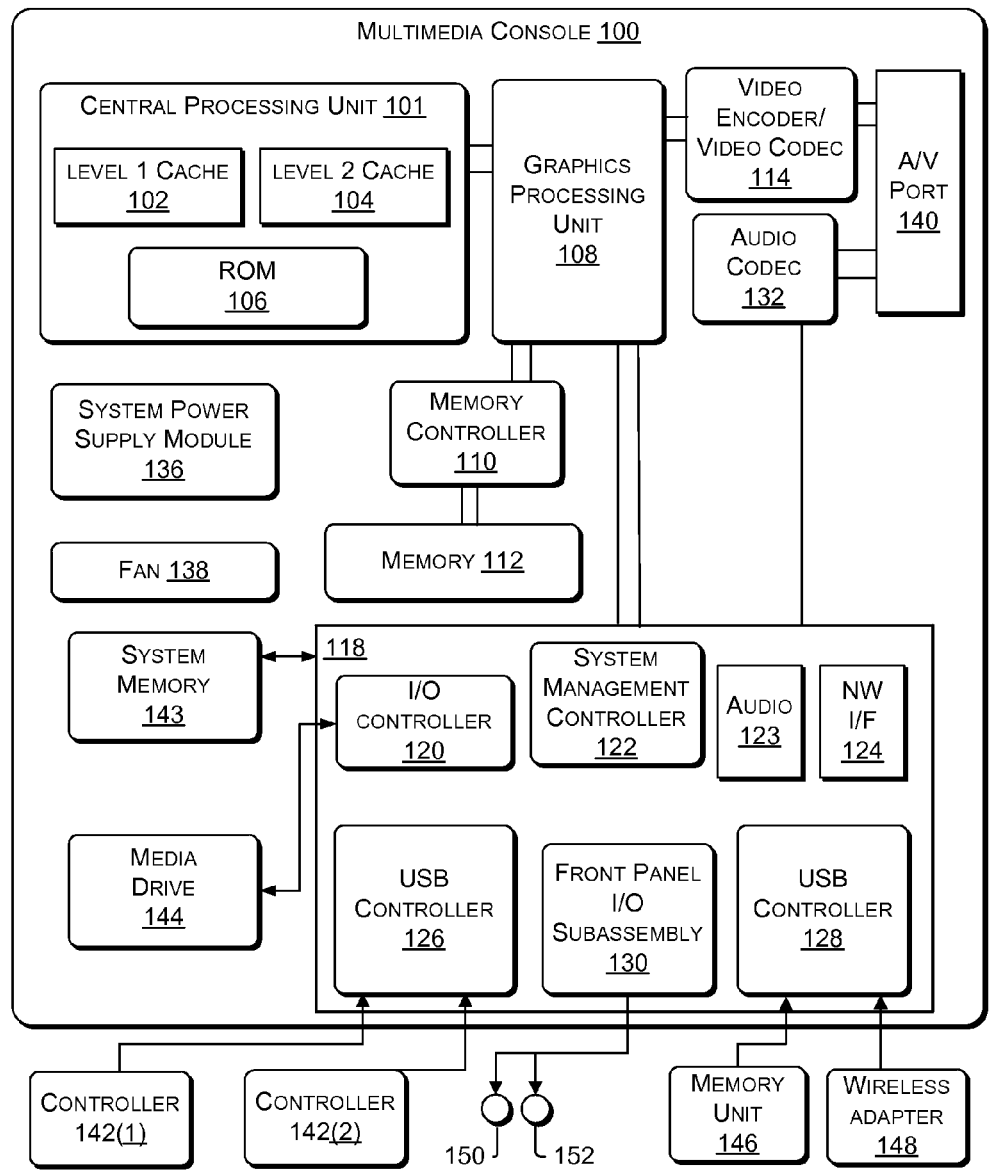

Various techniques are provided for allowing a person, or group of people, to interact with an application in a motion capture system. A depth camera system can track location and movement of a group in a physical space to provide a unitary input to an application. Audio information from the group can also be used as an input. An entertaining group experience can be realized as each person has some control over the application, while the group works as a team. In some cases, a person can have relatively more or less control than others based on his or her characteristics such as physical size.

FIGS. 1a and 1b depict an example embodiment of a motion capture system 10 in which a person 18 interacts with an application which simulates a boxing match. The motion capture system 10 is used to recognize, analyze, and/or track a human target such as the person 18, also referred to as user or player.

As shown in FIG. 1a, the motion capture system 10 may include a computing environment 12 such as a computer, a gaming system or console, or the like. The computing environment 12 may include hardware components and/or software components to execute applications such as educational and/or entertainment purposes.

The motion capture system 10 may further include a depth camera system 20. The depth camera system 20 may be, for example, a camera that may be used to visually monitor one or more people, such as the person 18, such that gestures and/or movements performed by the people may be captured, analyzed, and tracked to perform one or more controls or actions within an application, such as animating an avatar or on-screen character, as will be described in more detail below.

The motion capture system 10 may be connected to a audiovisual device 16 such as a television, a monitor, a high-definition television (HDTV), or the like that provides a visual and audio output to the user. An audio output can also be provided via a separate device. To drive the audiovisual device 16, the computing environment 12 may include a video adapter such as a graphics card and/or an audio adapter such as a sound card that provides audiovisual signals associated with an application. The audiovisual device 16 may be connected to the computing environment 12 via, for example, an S-Video cable, a coaxial cable, an HDMI cable, a DVI cable, a VGA cable, or the like.

The person 18 may be tracked using the depth camera system 20 such that the gestures and/or movements of the person are captured and used to animate an avatar or on-screen character and/or interpreted as input controls to the application being executed by computer environment 12. Thus, according to one embodiment, the user 18 may move his or her body to control the application and/or animate an avatar or other on-screen character.

As an example, the application can be a boxing game in which the person 18 participates and in which the audiovisual device 16 provides a visual representation of a boxing opponent 38 to the person 18. The computing environment 12 may also use the audiovisual device 16 to provide a visual representation of a player avatar 40 which represents the person, and which the person can control with his or her bodily movements.

For example, as shown in FIG. 1b, the person 18 may throw a punch in physical space, e.g., a room in which the person is standing, to cause the player avatar 40 to throw a punch in a virtual space which includes a boxing ring. Thus, according to an example embodiment, the computer environment 12 and the depth camera system 20 of the motion capture system 10 may be used to recognize and analyze the punch of the person 18 in physical space such that the punch may be interpreted as an input to an application which simulates a boxing match, to control the player avatar 40 in the virtual space.

Other movements by the person 18 may also be interpreted as other controls or actions and/or used to animate the player avatar, such as controls to bob, weave, shuffle, block, jab, or throw a variety of different punches. Furthermore, some movements may be interpreted as controls that may correspond to actions other than controlling the player avatar 40. For example, in one embodiment, the player may use movements to end, pause, or save a game, select a level, view high scores, communicate with a friend, and so forth. The player may use movements to select the game or other application from a main user interface. Thus, a full range of motion of the user 18 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual space of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the person 18.

FIG. 2 depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light component 24, a three-dimensional (3-D) camera 26, and a red-green-blue (RGB) camera 28 that may be used to capture the depth image of a scene. For example, in time-of-flight analysis, the IR light component 24 of the depth camera system 20 may emit an infrared light onto the physical space and use sensors (not shown) to detect the backscattered light from the surface of one or more targets and objects in the physical space using, for example, the 3-D camera 26 and/or the RGB camera 28. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the depth camera system to a particular location on the targets or objects.

According to another embodiment, the depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, Flash memory, or a hard disk. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for each of: raising one or both arms up or to the side, rotating the arms in circles. flapping one's arms like a bird, leaning forward, backward, or to one side, jumping up, standing on one's toes by raising ones heel's, walking in place, walking to a different location in the field of view/physical space, and so forth. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

FIG. 3 depicts an example block diagram of a computing environment that may be used in the motion capture system of FIG. 1a. The computing environment can be used to interpret one or more gestures or other movements and, in response, update a visual space on a display. The computing environment such as the computing environment 12 described above with respect to FIGS. 1a, 1b and 2 may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
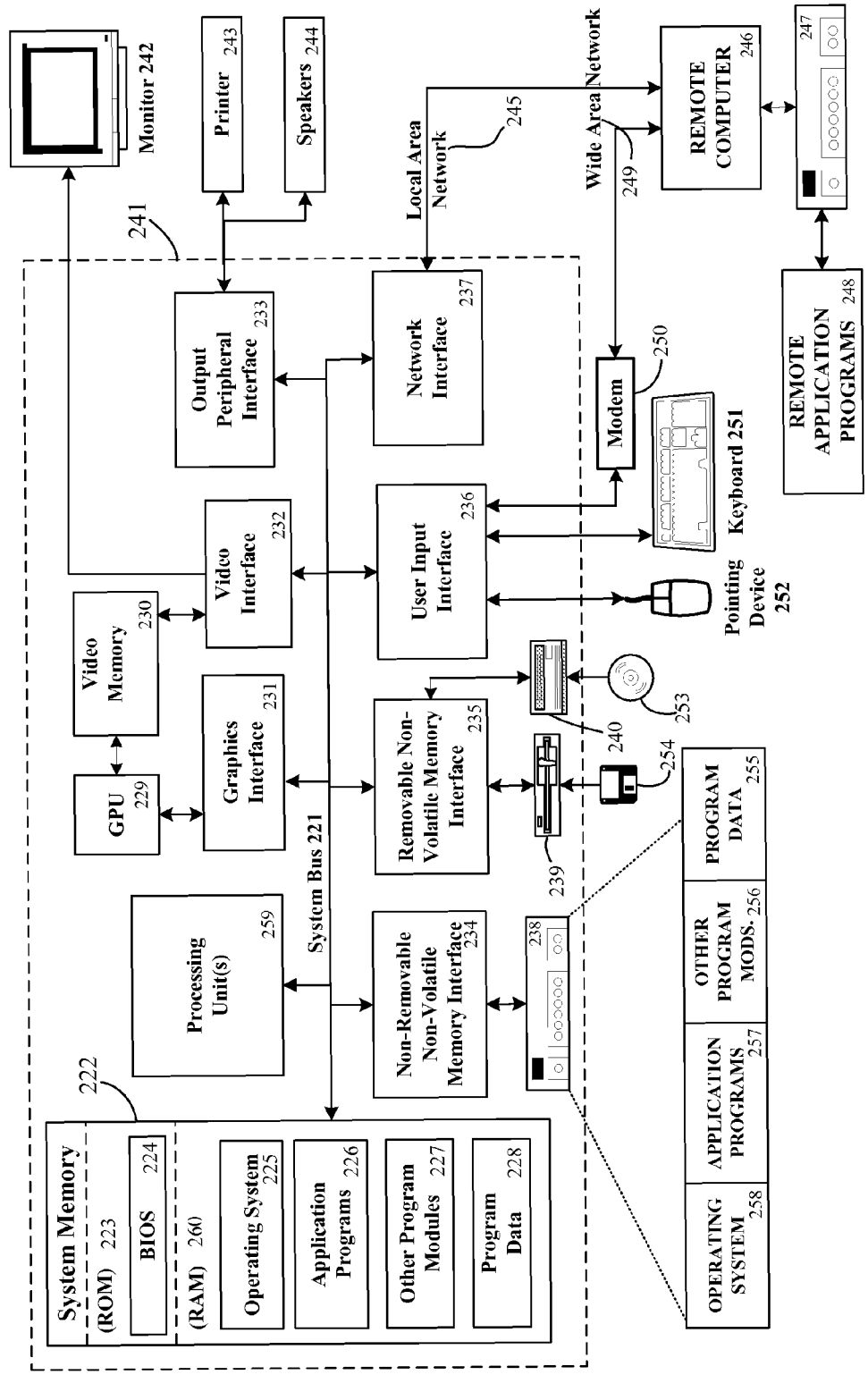

FIG. 4 depicts another example block diagram of a computing environment that may be used in the motion capture system of FIG. 1 a. The computing environment can be used to interpret one or more gestures or other movements and, in response, update a visual space on a display. The computing environment 220 comprises a computer 241, The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

FIG. 5 depicts a method for enabling one or more people to interact with a motion capture system. Step 500 tracks one or more people in a field of view of a motion capture system. Further details of step 500 are provided in connection with FIGS. 6a-6j and 7a-7e. The tracking can analyze a depth image along with position data from head tracking to identify masses within the depth image that represent individual people. For robustness to incomplete data, the tracking can aggregate all information available from techniques such as skeletal tracking and gesture recognition to extrapolate mass data for individuals and limbs. Masses can be detected using a variety of algorithms, including hierarchical clustering. Tracking can determine size, position, velocity, acceleration and jerk of aggregate and individual masses to drive application control states as well as animation on avatars that represent the individuals or group being tracked.

Step 502 tracks audio of one or more people. As mentioned, audio signals can include vocal sounds of people such as spoken words, whistling, shouts and other utterances as well as non-vocal sounds such as clapping hands or stomping feet. Tone and volume can be detected. Step 504 provides inputs to an application based on the tracking of steps 500 and 502. For example, this can include information regarding movement and location of people in the field of view, information regarding audio and visual characteristics of the physical space and the people in the physical space, such as colors of people's clothes, and size and shape of the people, as well as characteristics of inanimate objects in the physical space such as furniture, e.g., size, shape, location, and color. At step 506, the application responds to the inputs, as discussed further in connection with FIGS. 7a-7e, 8a-8d and 9a-9d.

FIG. 6a depicts an example method for tracking movement of one or more people as set forth in step 500 of FIG. 5. The example method may be implemented using, for example, the depth camera system 20 and/or the computing environment 12, 100 or 220 as discussed in connection with FIGS. 2-4.

One or more people can be scanned to generate a model such as a skeletal model, a mesh human model, or any other suitable representation of a person or group of people. The model may then be used to interact with an application that is executed by the computing environment. The scan to generate the model can occur when an application is started or launched, or at other times as controlled by the application of the scanned person.

A person or group may be scanned to generate a skeletal model that may be tracked such that physical movements or motions of the user 58 may act as a real-time user interface that adjusts and/or controls parameters of an application. For example, the tracked movements of a person or group may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, discussed in connection with FIGS. 6e and 6f.

At decision step 604, a determination is made as to whether the depth image includes one or more human targets. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the one or more human targets for body parts. The one or more human targets may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model, discussed in connection with FIGS. 6e and 6f. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the one or more human targets. In one embodiment, measurement values determined by the scanned bitmask may be used to define one or more joints in a skeletal model. The one or more joints are used to define one or more bones that correspond to a body part of a human. For example, FIG. 6e depicts an example skeletal model 630 of a person as set forth in step 608 of FIG. 6a, and FIG. 6f depicts another example skeletal model 640 of a person as set forth in step 608 of FIG. 6a.

Generally, each body part may be characterized as a mathematical vector defining joints and bones of the skeletal model. Body parts can move relative to one another at the joints. For example, a forearm segment 638 is connected to joints 636 and 639 and an upper arm segment 634 is connected to joints 632 and 636. The forearm segment 638 can move relative to the upper arm segment 634.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's or group's location several times per second. As the user or group moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of one or more persons can be used.

Figure 6B:
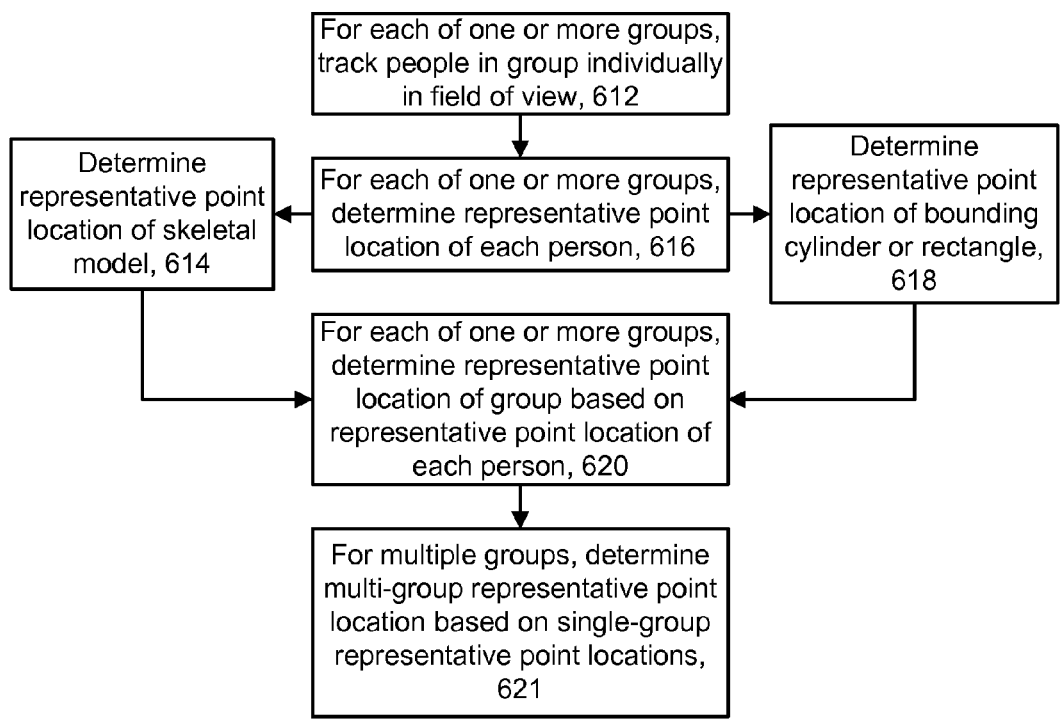
FIG. 6b depicts an example method for tracking one or more people in a field of view as set forth in step 500 of FIG. 5, where a representative point location for each person is determined.

FIG. 6b depicts an example method for tracking one or more people in a field of view as set forth in step 500 of FIG. 5, where a representative point location for each person is determined. In one approach, for each group of one or more groups, people in a group are tracked individually in the field of view, at step 612. Note that a group can have only a single person as well. Step 616 determines a representative point location of each person, for each group of one or more groups. The representative point location can represent a central point, e.g., a center of mass or centroid, which can be used to represent the location of a person, and which can be tracked to represent the movement of a person. The centroid is the same as the center of mass for an object with uniform density, which is a reasonable assumption for a human. The representative point location can be calculated in different ways. In one approach, at step 614, the representative point location is determined for a skeletal model which is obtained from each person in the field of view (see FIG. 6h). In another approach, at step 618, the representative point location is determined for a bounding cylinder or rectangle, or other bounding shape, which encompasses each person in the field of view (see FIG. 6i). Step 620 determines a representative point location of a group of people based on the representative point location of each person in the group, for each group of one or more groups. Step 621, for multiple groups, determines a multi-group representative point location based on the single-group representative point locations. For instance, the multi-group representative point location can be a center of mass of the different single-group representative point locations (see FIG. 6j).

Figure 6C:
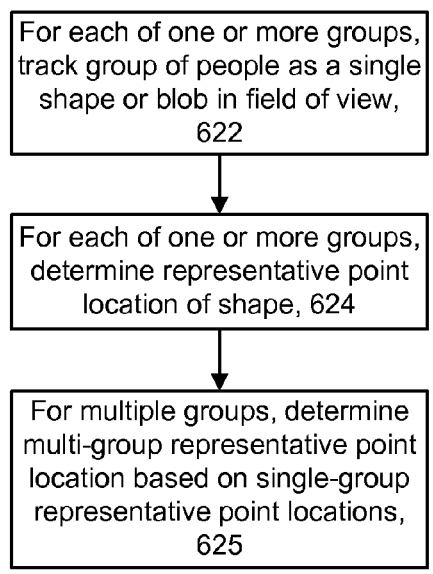
FIG. 6c depicts an example method for tracking one or more people in a field of view as set forth in step 500 of FIG. 5, where a representative point location for a single shape is determined.
Figure 6D:
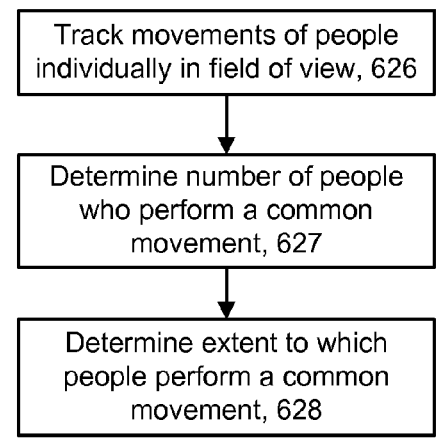
FIG. 6d depicts an example method for tracking one or more people in a field of view as set forth in step 500 of FIG. 5, where a common movement is determined.
Figure 6E:
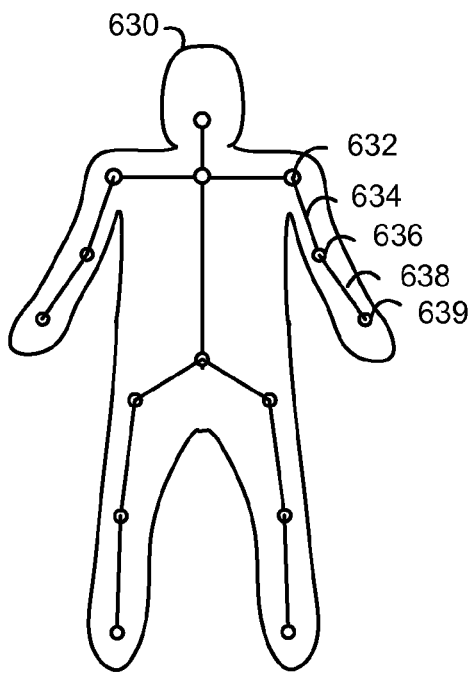
Figure 6F:
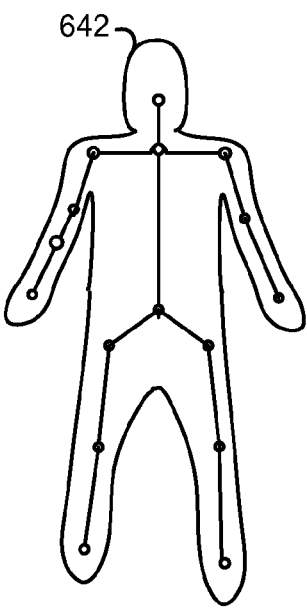
Figure 6G:
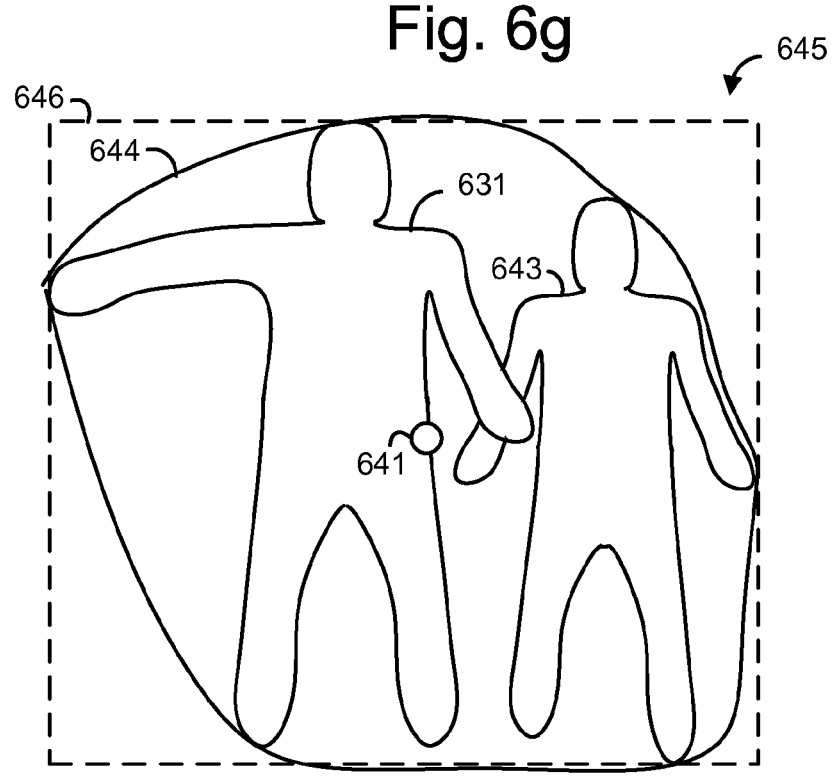
Figure 6H:
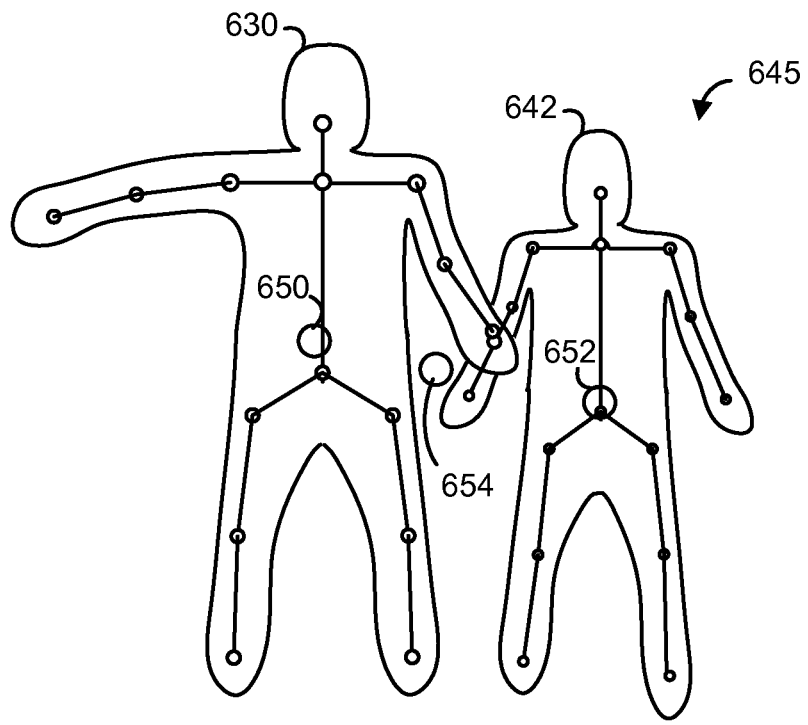
FIG. 6h depicts an example of determining a representative point location based on a skeletal model as set forth in step 614 of FIG. 6b.
Figure 6I:
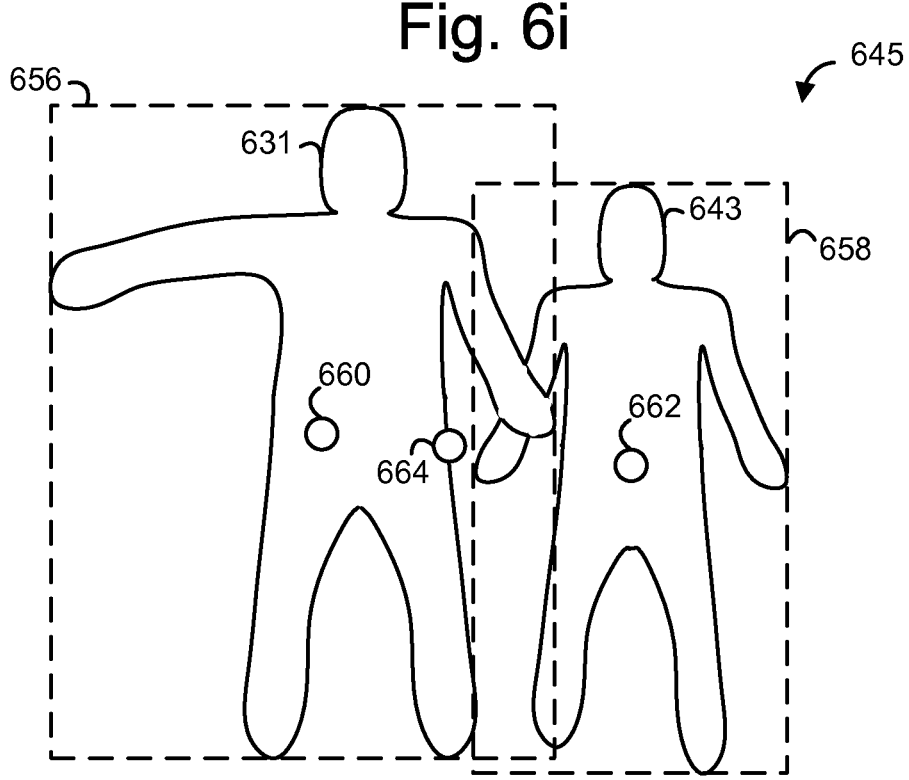
FIG. 6i depicts an example of determining a representative point location based on a bounding cylinder or rectangle as set forth in step 618 of FIG. 6b.

Regarding step 618 in FIG. 6b, in FIG. 6i, for the same group 645, the person 631 (or skeletal model 630) has a bounding shape 656, which is a defined volume shape that is scaled to just encompass the skeletal model. Similarly, the person 643 (or skeletal model 642) has a bounding shape 658. For the bounding shapes 656 and 658, the representative point locations and centroids are points 660 and 662, respectively.

As a further detailed example, consider a bounding cylinder, which is the smallest cylinder which encompasses a person, e.g., in width and height (see FIG. 7a).

FIG. 6c depicts an example method for tracking one or more people in a field of view as set forth in step 500 of FIG. 5, where a representative point location for a single shape is determined. Step 622 includes, for each group of one or more groups, tracking a group of people as a single shape, e.g., blob (see FIG. 6g), in the field of view, and step 624 includes, for each group of one or more groups, determining a representative point location of the shape. When there are multiple groups detected, step 625 includes determining a multi-group representative point location based on each single-group representative point location. For example, assume there are two distinct groups detected (first and second groups, see FIG. 6j). At each time point, two single-group representative point locations are determined, one for each group, and one multi-group representative point location is determined based on the two single-group representative point locations. For instance, the multi-group representative point location can be a center of mass of the two single-group representative point locations.

As a further example, consider the group 645 of two people with the skeletal models 630 and 642 as depicted in FIG. 6h. Point 650 is the representative point location for the skeletal model 630, and point 652 is the representative point location for the skeletal model 642. In this case, the representative point locations are the centroids of the skeletal models. This can be understood by noting that the point 650 is slightly shifted to the left of a center line down the middle of the torso of the skeletal model 630 since the arm is raised to the left. For the skeletal model 642, the centroid 652 is on a center line down the middle of the torso since the body, including arm position, is symmetric about the center line.

FIG. 6d depicts an example method for tracking one or more people in a field of view as set forth in step 500 of FIG. 5, where a common movement is determined. Step 626 includes tracking movements of people individually in a field of view. As mentioned previously, a gesture filter can be provided for each of a number of different movements such as: raising one or both arms up or to the side, rotating the arms in circles. flapping one's arms like a bird, leaning forward, backward, or to one side, jumping up, squatting down, standing on one's toes by raising ones heel's, walking in place, walking to a different location in the field of view/physical space, and so forth. By comparing a detected motion to each filter, a specified gesture or movement which is performed by one or more persons can be identified.

Step 627 includes determining a number of people who perform a common movement.

As an addition or alternative to step 627, step 628 includes determining an extent to which the people perform the common movement. For example, a bodily movement such as leaning to one's side can be performed to different extents. A slight lean of e.g., 10-20 degrees from vertical might represent a smaller extent while a lean of, e.g., 20-30 degrees represents a larger extent. Similarly, a bodily movement of raising one's arm can be achieved by an arm raise of, e.g., −20 degrees below horizontal to horizontal (0 degrees), which represents a smaller extent, and an arm raise of, e.g., horizontal (0 degrees) or anywhere above horizontal, represents a larger extent. Different extents can be similarly defined for jumping, waving and other bodily movements.

An extent to which a common movement is performed can also be based on a number of times the movement is performed. For example, a bodily movement of raising one's arm can be achieved by repeatedly recognizing an arm raise, where the arm is returned to a relaxed position at the person's side between arm raises. A count can be made of the number of arm raises in a specified amount of time. A frequency of arm raises could also be determined.

The application can respond differently based on the number of people who perform a common movement, and/or the extent to which the people perform the common movement. For instance, in a game in which a group controls a boat on a river (see FIG. 7a), the group may jump up together to cause the boat to jump over obstacles. The boat can jump higher when more people perform the movement of jumping up, and/or when the people jump up higher. To detect vertical movement of one or more people, vertical movement of one or more representative point locations can be tracked.

FIG. 6g depicts the group 645 as a blob 644, or with a group bounding shape 646. The blob 644 can be defined as an approximate free-form bounding shape for the group 645, while the bounding shape 646 can be a cylinder or rectangle, for example. The representative point location for the bounding shape 646 is the centroid at point 641. The representative point location for the blob 644 is similar to the point 641 in this example. This approach does not require knowing how many people are in the blob or that there are multiple people. We can treat the overall mass as a single actor. Moreover, it is not necessary to map the image data to a skeletal model. The outline or perimeter of each person's body, 631 and 643, is sufficient to identify the blob's shape.

In FIG. 6h, the representative point location and centroid for the group is point 654, which is between the points 650 and 652.

In FIG. 6i, the representative point location and centroid for the group is point 664, which is between the points 660 and 662.

Figure 6J:
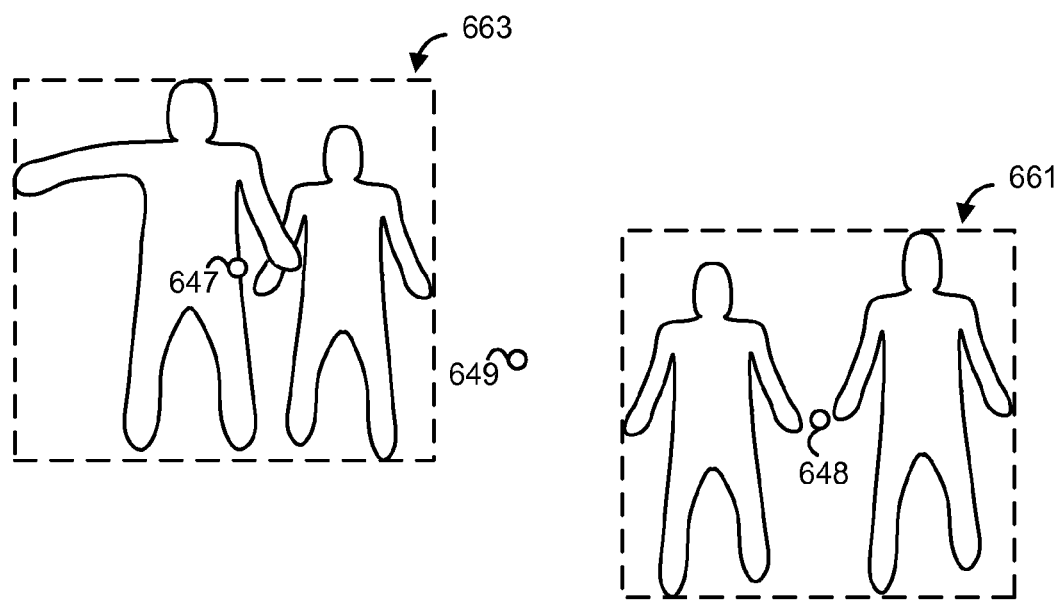
FIG. 6j depicts an example of determining a multi-group representative point location based on multiple single-group representative point locations, as set forth in step 621 in FIG. 6b and step 625 in FIG. 6c.

FIG. 6j depicts an example of determining a multi-group representative point location based on multiple single-group representative point locations, as set forth in step 621 in FIG. 6b and step 625 in FIG. 6c. Here, point 647 is a single-group representative point location of a first group 663, point 648 is a single-group representative point location of a second group 661, and point 649 is a multi-group representative point location based on each of the single-group representative point locations 647 and 648.

FIG. 7a depicts bounding cylinders 728, 732 and 736 for three different people in a group, when viewing the physical space 726 from overhead. FIG. 7a also includes a display 700, depth camera system 720, including representative sensor 718, and a physical space 726 in the field of view of the depth camera system, where lines 722 and 724 are boundaries of the field of view. A coordinate system is defined which includes an optical axis or z-axis of the depth camera, e.g., a line that extends in a center of a direction in which the depth camera sees the physical space, where the field of view is typically symmetrical about the optical axis. If the depth camera faces in the same direction as the display, the optical axis is generally perpendicular to the plane of the display. A cross axis (y-axis) is also defined which is perpendicular to the z-axis. An x-axis, not shown, can extend vertically in the physical space.

In the example of FIG. 7a, example, the representative point location of a group of people can be determined by obtaining coordinates of the representative point location along two or three axes in a Cartesian coordinate system. For example, representative point locations are central points 730, 734 and 738 of the people represented by bounding cylinders 728, 732 and 736, respectively. Along the y-axis, central points 730, 734 and 738 are at coordinates y1, y2 and y3, respectively. The y-axis representative point location of the group is ycg=(y1+y2+y3)/3, assuming each person is weighted equally. In another approach, each person is weighted separately according to a physical characteristic such as width. For instance, w1, w2 and w3 are the widths of the bounding cylinders 728, 732 and 736, respectively. In this case, the y-axis representative point location of the group is ycg=((w1×y1)+(w2×y2)+(w3×y3))/(w1+w2+w3). In general, the y-axis representative point location of the group is sum over (w×y)/sum over w. FIG. 7a is also discussed further below in connection with the control input which the group provides to the application.

Similarly, along the z-axis, central points 730, 734 and 738 are at coordinates z1, z2 and z3, respectively. The z-axis representative point location of the group is zcg=(z1+z2+z3)/3, assuming each person is weighted equally. If each person is weighted separately according to width, the z-axis representative point location of the group is zcg=((w1×z1)+(w2×z2)+(w3×z3))/(w1+w2+w3). In general, the z-axis representative point location of the group is sum over (w×z)/sum over w. The representative point location of the group is then defined by (ycg, zcg), at point 740. A third coordinate of the representative point location of the group, which is along the vertical x-axis could be used as well.

Regarding size, note that the depth camera system adjusts for the fact that people who are further away from the camera are represented by fewer pixels than people who are closer to the camera.

Note that, as mentioned, it is possible to detect multiple groups of people in the field of view. For example, the field of view can be divided into regions along the z-axis, and/or y-axis, and a separate group detection made in each region. The size and number of regions can be decided adaptively based on the arrangement of people in the field of view. The regions can be defined so that clusters of people are kept in a common region. Histograms and other cluster identification techniques can be used in this regard. Moreover, each group can provide a separate input to the application. Or, a unitary multi-group input can be provided based on a combination of the single-group inputs. Further, the detected locations can be tracked over time to determine single-group movements, and a multi-group movement which is based on the single-group movements. Note that a multi-group movement or location input to an application is based on the movement or location of each of the constituent groups.

FIG. 7a depicts an example display and physical space, where a size and representative point location of each person is determined, and a representative point location for the group is determined and used to steer an avatar. As mentioned, FIG. 7a depicts bounding cylinders 728, 732 and 736 for three different people in a group, when viewing the physical space 726 from overhead. FIG. 7a also includes a display 700, depth camera system 720, including representative sensor 718, and a physical space 726 in the field of view of the depth camera system, where lines 722 and 724 are boundaries of the field of view. Note that the depth camera system 720, including representative sensor 718, and the display 700 are shown from the viewpoint of a person standing in the field of view and watching the display.

An example application provides a game in which the group steers a boat in a river according to the representative point location of the group in the field of view. The river may have turns and obstacles which the group attempts to overcome. A boat 710 and an avatar passenger 712 are depicted. In one approach, when the group members are positioned so that their representative point location 740 is to the left of the z-axis, the boat is steered to the left. When the group members are positioned so that their representative point location 740 is to the right of the z-axis, the boat is steered to the right. Or, the steering input could be determined relative to an initial location of the group. Other control actions could be provided as well, such as raising the front of the boat up, e.g., to overcome obstacles in the water, by having the group move forward or perhaps raise their hands over their head. Or, the speed of the boat might be controlled to be faster when the group moves forward in the field of view 726 and slow when it moves back. The audio level of the group can provide an input as well, e.g., so that the boat goes faster when the volume is louder. Thus, a many-to-one input mechanism is provided where the movement, location and/or audio of each person is aggregated to a unitary input to the application. An enhanced entertainment experience and sense of team work can thereby be provided.

Note that the boat 710 could be considered to be a non-human avatar since it represents the group and is controlled by movements and other inputs from the group.

As mentioned, it is possible to detect multiple groups of people in the field of view, and to provide a separate control input to the application from each group. For example, in addition to the group of three people depicted in FIG. 7a, assume there is a second group (not shown) behind them as spectators. The second group may be initially relatively inactive. However, when an exciting moment occurs in the display, the people in the second group may stand up and cheer, and begin yelling. The movement and increased audio level from the second group can be detected and provided as an input to which the application responds, such as by speeding up the boat 710 and/or by providing upbeat background music. In another example, the people in the second group may begin swaying left and right to cause some other response by the application.

Optionally, in a networked approach, multiple people concurrently interact with an application from different locations. For example, the people represented by the bounding cylinders 728 and 732 may be in one physical location, in a first field of view of a first motion capture system, and the person represented by the bounding cylinder 736 may be in another physical location, in a second field of view of a second motion capture system. The people can arrange to begin interacting in a virtual space at the same time. The first motion capture system tracks the two people as they move in the first field of view and the second motion capture system tracks the other person as he or she moves in the second field of view.

The first motion capture system receives data via a network from the second motion capture system regarding the associated person's location and movements in the second field of view, and combines this information with location and movement information from the first field of view to provide a unitary input to the application. The application then responds to the unitary input with an audio-visual output. The second motion capture system can similarly receive data via the network from the first motion capture system so that the associated person receives the same audio-visual output from the application.

FIG. 7b depicts an example display and physical space based on FIG. 7a after the representative point location 740 for the group moves to the right, near the z-axis center. In response, the boat 710 levels out and the boat and passenger 712 are steered straight ahead, in the display 750.

FIG. 7c depicts an example display and physical space based on FIG. 7b when a separate avatar is provided for each player. For example, passenger avatars 756, 758 and 754 represent the people represented by the bounding cylinders 728, 732 and 736, respectively. Moreover, in the display 752, the avatars are positioned in the boat 710 correspondingly to the position of the people in the field of view. For example, avatars 756 and 754 are roughly abreast of one another, and avatar 758 is slightly behind the others and to the left of center. Likewise, the people represented by the bounding cylinders 756 and 754 are roughly abreast of one another, and the person represented by the bounding cylinder 758 is slightly behind the others and to the left of center. This example represents how a person's position in a physical space controls a position in the virtual space.

Figure 7D:
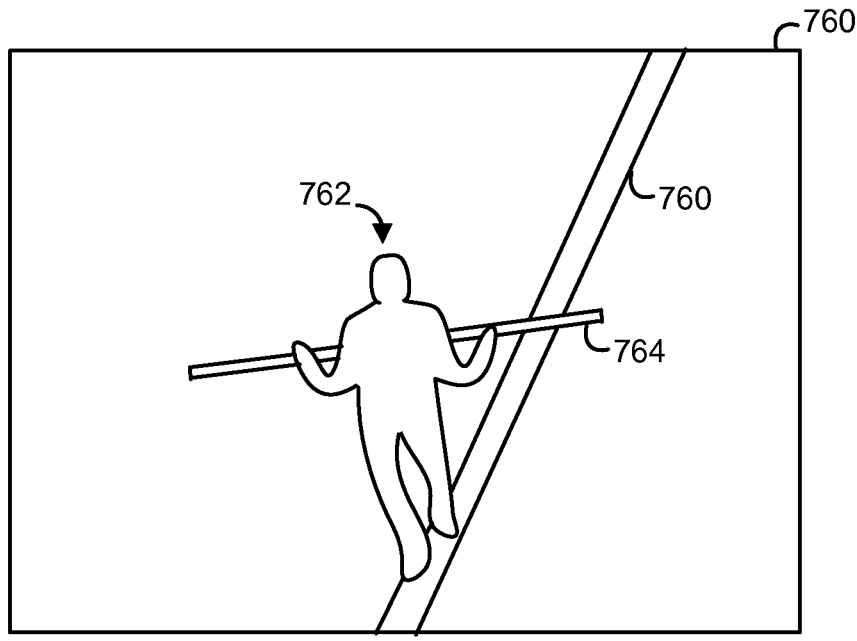
FIG. 7d depicts an example display where a group provides an input in a balancing game.

FIG. 7d depicts an example display where a group provides an input in a balancing game. Similar to the steering game, the position of the group can be used as an input to determine the balance of an avatar. In particular, in the display 760, an avatar 762 walks on a tight rope 760, holding a pole 764 for balance. The group attempts to keep the avatar balanced based on their position in the field of view. Here, the avatar is leaning slightly to the left. Or, each person in the group may lean to one side to control the avatar.

Figure 7E:
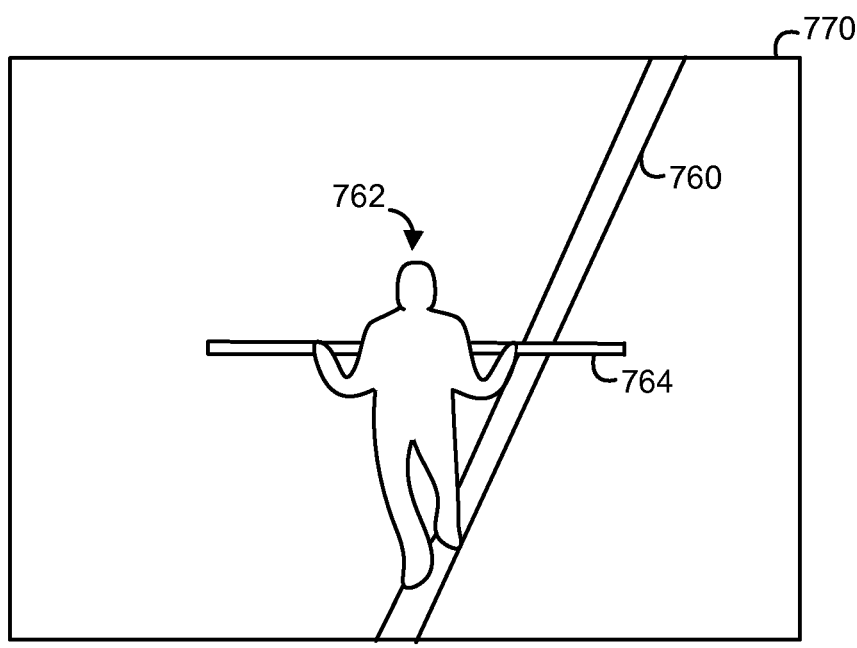
FIG. 7e depicts an example display based on FIG. 7d after the representative point location for the group moves.

FIG. 7e depicts an example display based on FIG. 7d after the representative point location for the group moves. In the display 770, the avatar 762 has been straightened out based on input from the group.

Figure 8A:
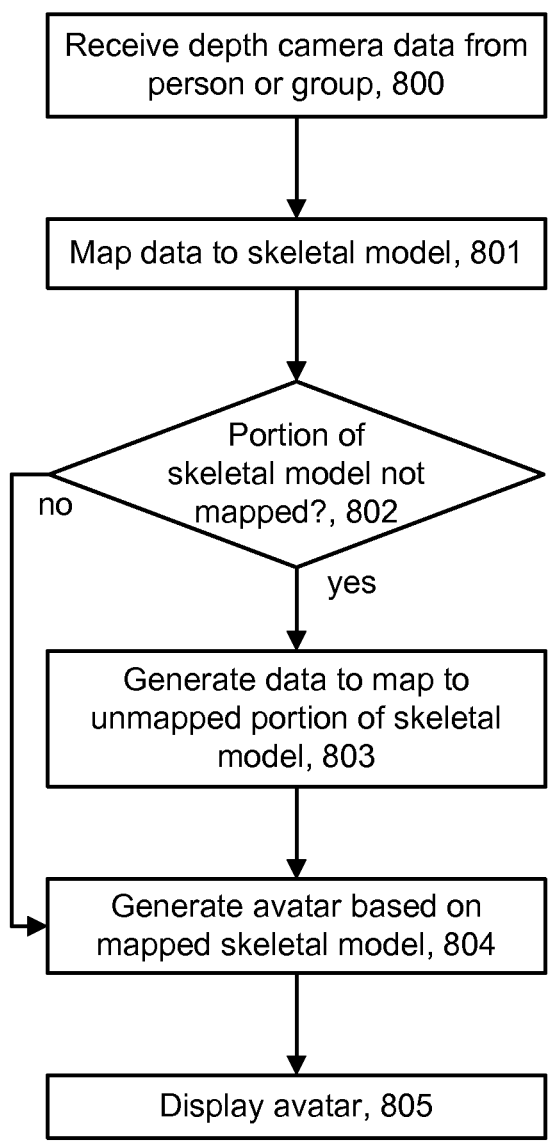
FIG. 8a depicts a method for generating missing data for a person who is occluded or partially out of the field of view.

FIG. 8a depicts a method for generating missing data for a person who is occluded or partially out of the field of view. In some situations, the depth camera system may be temporarily unable to fully capture the body of a person who is being tracked and is actively interacting with an application, e.g., due to the person being partially occluded by objects or other people in the field of view, or when part of the body is out of the field of view. In such situations, there is a risk that an avatar which is generated based on a skeletal model of the person will be incomplete, resulting in a discontinuous and confusing experience for the person. To avoid such an outcome, measures can be taken to generate data which represents a missing part of the body, which was not captured by the depth camera system.

Step 800 includes receiving depth camera data from a person or group. The data may represent one portion of a person which is visible to the depth camera system. Another portion of the person is not visible to the depth camera system and is therefore not represented by the data. Step 801 includes mapping the data to a skeletal model for each person. Data which represents only a portion of the body, e.g., head, torso, arms and one leg, is mapped to a corresponding portion of a skeletal model. Such mapping can involve associating pixel data with a skeletal model of a human to create a model of a human target, as discussed, e.g., in connection with FIG. 6a.

At decision step 802, if no substantial portion of the skeletal model is not mapped, step 804 is performed, in which an avatar is generated based on the essentially fully mapped skeletal model. An unmapped portion may be considered substantial if it encompasses a specified portion of the skeletal model such as 10-20% of the surface area of the model which would otherwise be mapped if the person was fully captured by the depth camera system. This represents a portion which, if not mapped, would result in an incomplete avatar that provides a discontinuous or confusing experience to the person. The resulting avatar which is generated is displayed at step 805. If a portion of the skeletal model is not mapped at decision step 802, step 803 is performed, in which data is generated to map to the unmapped portion of the skeletal model. The generated data, which represents the portion of the person which is not visible to the depth camera system, is mapped to a remaining portion of the skeletal model to provide an essentially fully mapped skeletal model. The generated data can provide an animation of a missing portion of the person. For example, as discussed further below in connection with FIGS. 8b-8d, a limb of a person such as the leg may be occluded, in which case step 803 generates data to represent a leg. This can be done based on the skeletal model which has been used to represent the person in previous frames. Physical characteristics of the person such as size and shape are known from the skeletal model. Moreover, based on the portion of the skeletal model which corresponds to the visible portion of the person, characteristics of the skeletal model which correspond to the not visible portion of the person can be determined. For instance, if one leg is occluded but the visible portion of the body indicates the person is standing, the occluded leg can be generated which is consistent with a standing pose. Color and texture information for the generated data can be determined, e.g., based on color and texture information for the visible portion of the body and/or previous frames of data which show the now-missing body portion. Gesture recognition can also be used to determine characteristics of a missing body portion such that if the visible portion of the body is consistent with a particular gesture, the missing part of the body should also be consistent with that gesture.

An avatar is generated at step 804 based on the skeletal model which is mapped partly based on image data obtained by the depth camera system and the generated data. The avatar represents the person based on the essentially fully mapped skeletal model, so that the avatar represents both the visible and not visible portions of the person.

Note that the process of FIG. 8*a* can be repeated multiple times per second, so that the avatar is updated as the visible and not visible portions of the person vary in different frames of image data which are provided by the depth camera system.

Figure 8B:
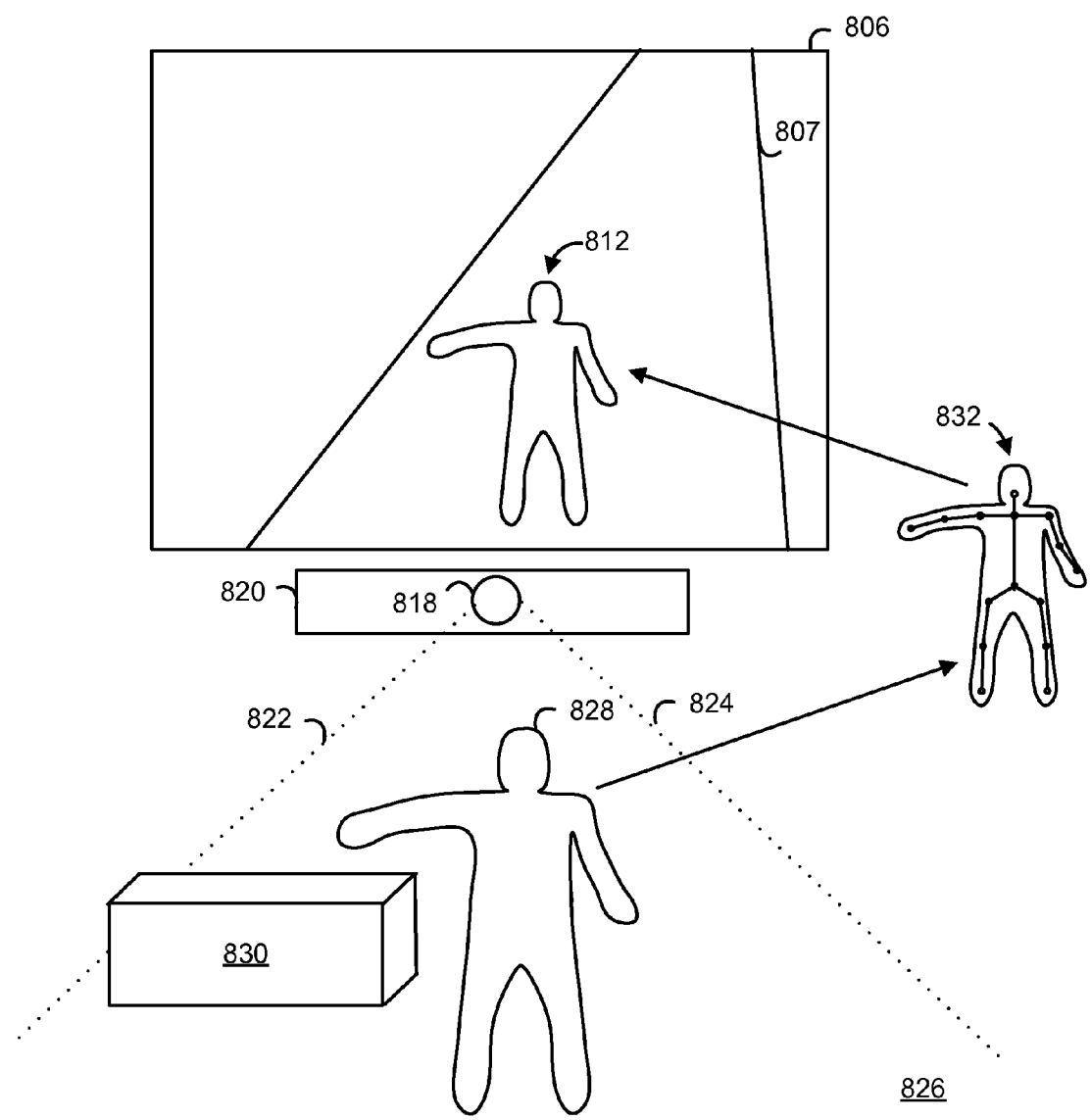
FIG. 8b depicts an example display and physical space based on FIG. 8a, where a person is not occluded in the field of view.

FIG. 8*b* depicts an example display and physical space based on FIG. 8*a*, where a person is not occluded in the field of view. A display 806 depicts a virtual space in which an avatar 812 stands on a road 807. A depth camera system 820 includes a representative sensor 818, and a physical space 826 is provided in the field of view of the depth camera system, where lines 822 and 824 are boundaries of the field of view. A person 828 and an object 830, such as a piece of furniture, are in the physical space. In this example, the sensor 818 has a clear view of the person 828, and can capture all of the image data which is necessary to provide a fully mapped skeletal model 832, from which the avatar 812 is generated. The skeletal model is a conceptual construct which not actually seen.

Figure 8C:
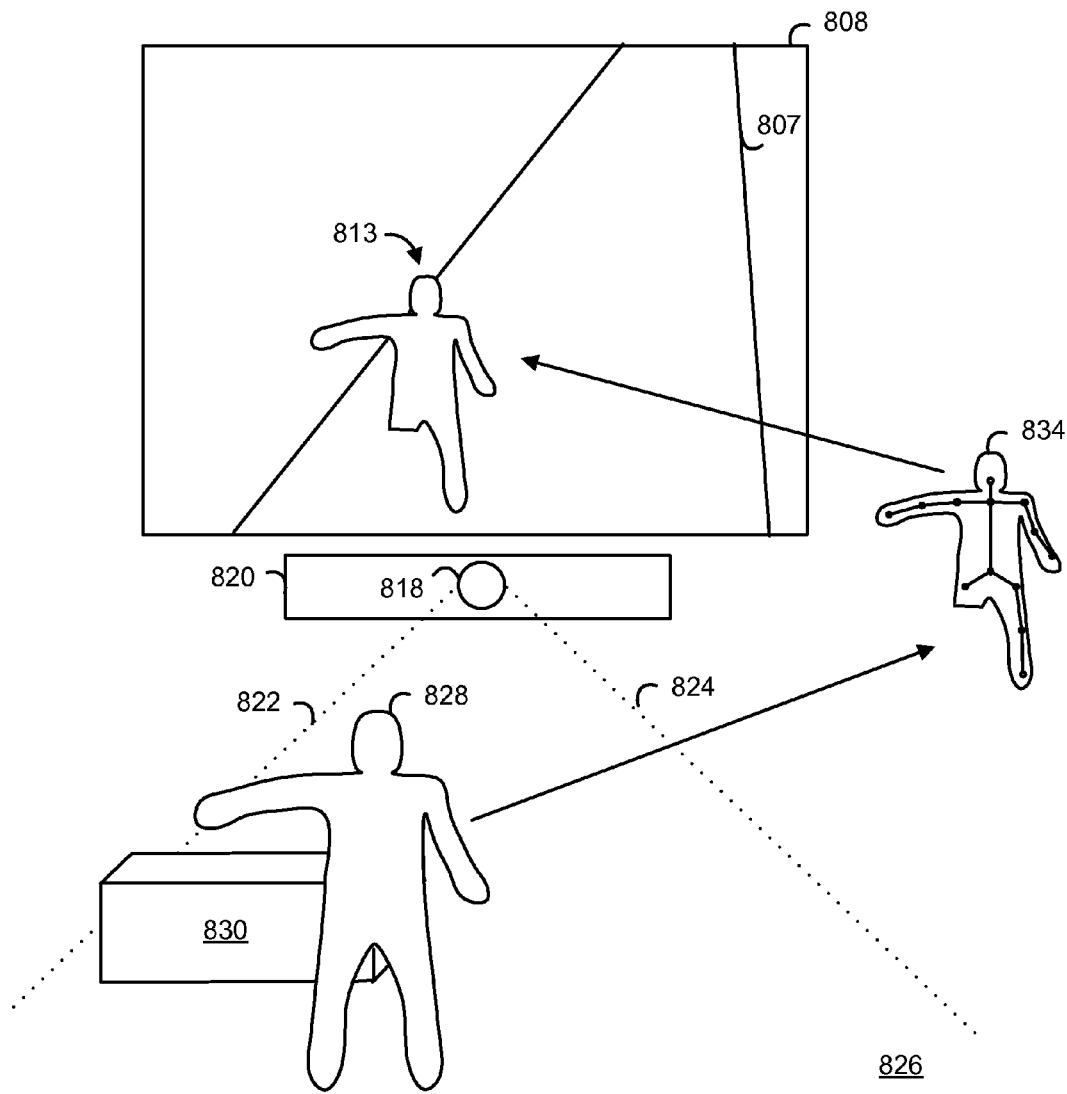
FIG. 8c depicts an example display and physical space based on FIG. 8b, where a person is partially occluded in the field of view, and the resulting avatar is incomplete.

FIG. 8*c* depicts an example display and physical space based on FIG. 8*b*, where a person 828 is partially occluded in the field of view by the object 830, and the resulting avatar 813 is incomplete. When interacting with the application, the person 828 may move around in the physical space so that a portion of the person becomes invisible to the depth camera system. In this case, there is insufficient image data to map to the skeletal model 834. For example, the left leg of the person 882 may be occluded by the object 830, in which case there will be no image data to map to the left leg of the skeletal model 834. When the avatar 813 is created from the skeletal model 834 on the display 808, it will be missing a left leg. This can result in confusion for the person 828, especially if the avatar's appearance changes often as the person is repeatedly occluded and then not occluded at different times when interacting with the application, causing corresponding changes in the avatar.

Figure 8D:
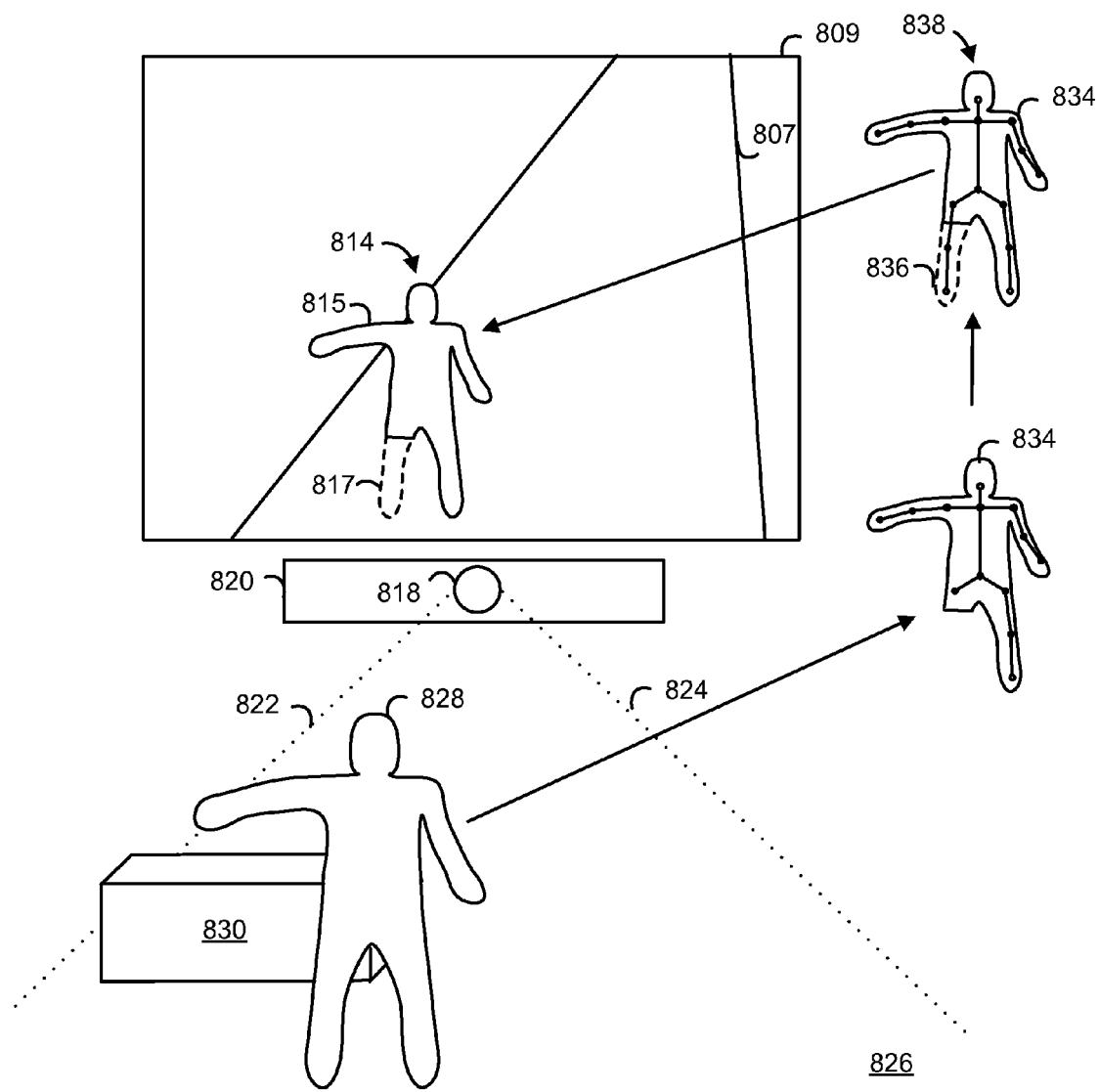
FIG. 8d depicts an example display and physical space based on FIG. 8b, where although a person is partially occluded in the field of view, the resulting avatar is complete.

FIG. 8*d* depicts an example display and physical space based on FIG. 8*b*, where although the person 828 is partially occluded in the field of view, the resulting avatar 814 is complete. Here the image data from the visible portion of the person 828 is mapped to the skeletal model 834, as depicted also in FIG. 8*c*. However, data is generated as depicted by leg 836 to represent the missing body portion. This generated data is combined with the portion 834 of the skeletal model which is mapped by the visible body portion to provide an overall skeletal model 838 which essentially fully represents the person 828. As a result, the avatar 814 which is created from the skeletal model 838 represents both the visible and invisible body parts of the person 828. For example, the left leg 817 of the avatar 814 represents the left leg of the person, based on the left leg 836 of the skeletal model 838, and remaining body portion 815 of the avatar 814 represents the remaining body portion of the person, based on the remaining body portion 834 of the skeletal model 838.

Figure 9A:
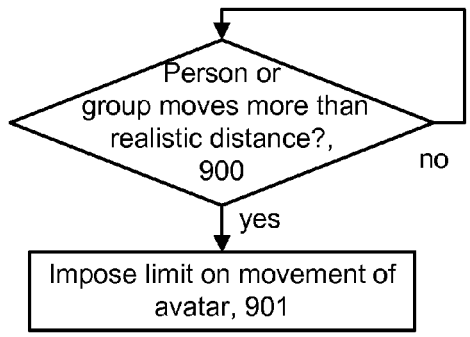
FIG. 9a depicts an example of an application responding to inputs as set forth in step 506 of FIG. 5, where a limit is imposed on the movement of an avatar when a movement of a person is unrealistic.

FIG. 9*a* depicts an example of an application responding to inputs as set forth in step 506 of FIG. 5, where a limit is imposed on the movement of an avatar when a movement of a person is unrealistic. Additional techniques are provided for avoiding discontinuous or confusing outputs from the application. In one approach, movements relating, e.g., to changes in location in the physical space and be evaluated to determine if they are realistic. The tracking process may break down at times for various reasons, such as occlusions, people temporarily leaving and returning to the field of view, an inability to distinguish between players due to similar appearances, use of props, players swapping positions, and so forth. This can result in erroneous, e.g., discontinuous or confusing outputs, by the application, such as an avatar making sudden movements across the display.

Generally, based on frames of image data of a field of view of a depth camera system, at least one person's body is tracked in the field of view, and the tracking provides results for use by an application in providing an avatar in a virtual space on a display, such that the avatar represents the least one person's body and is controlled by movement of the at least one person's body. A determination is made as to whether the results from the tracking are consistent with at least one predetermined scenario which poses a risk of causing the application to provide an erroneous output on the display. For example, decision step 900 determines if a predetermined scenario occurs in which at least one person's body moves a distance which is more than a realistic distance in the field of view in a specific time interval. In response, based on the results from the tracking being consistent with the at least one predetermined scenario, steps are taken to reduce the risk of causing the application to provide an erroneous output on the display. For example, step 901 includes imposing a limit on movement of the avatar on the display.

For example, the avatar could be limited to moving a fixed amount or at a fixed rate in the display. The amount or rate could be chosen to avoid a discontinuous appearance on the display. The avatar could alternatively be limited so that no movement is permitted. The avatar could alternatively be limited so that an increasing amount of movement is permitted in proportion to a duration at which the at least one person's body remains at the location which was considered to represent an unrealistic movement, until a normal amount of movement is permitted. The amount of movement can be defined, e.g., with regard to movement of the avatar on the display and/or movement of the avatar in the virtual space.

Figure 9B:
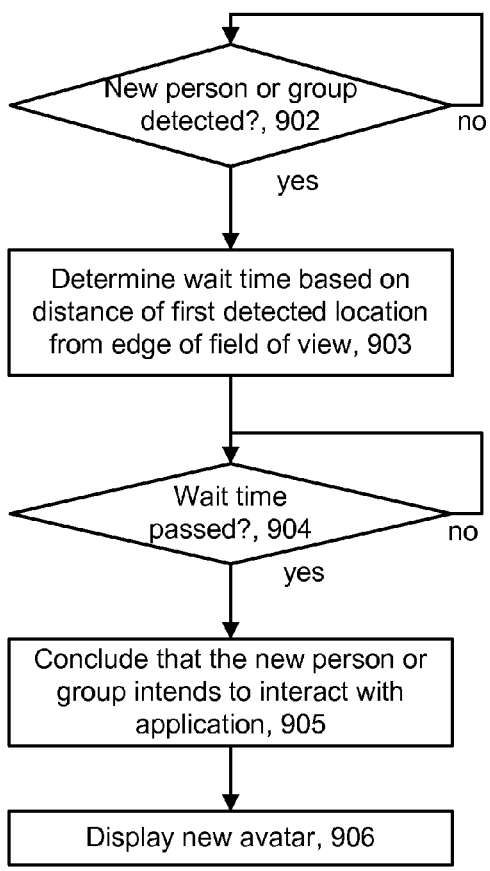
FIG. 9b depicts an example of an application responding to inputs as set forth in step 506 of FIG. 5, where a wait time is imposed before concluding that a new person or group intends to interact with an application.
Figure 9C:
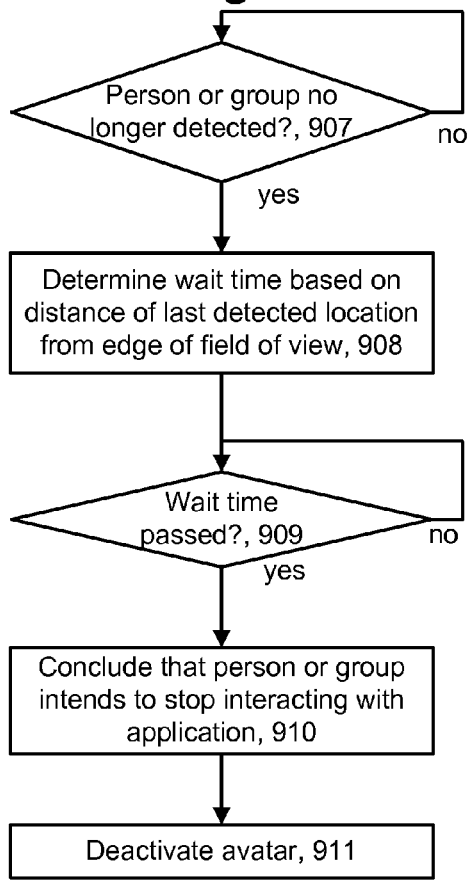
FIG. 9c depicts an example of an application responding to inputs as set forth in step 506 of FIG. 5, where a wait time is imposed before concluding that a new person or group is no longer interacting with an application.

Note that the techniques of FIGS. 9*a*-9*c* can be implemented in the depth camera system and/or the computing environment. Also, for a person, the movement can be determined based on movement of a representative point location of the person, and for a group, the movement can be determined based on movement of a representative point location of the group, as discussed previously. Moreover, the determination can be specific to the context of an application. For example, in an application which involves substantial movements by the players in the physical space, a larger movement may be realistic compared to an application which does not involve substantial movements by the players. The determination can be adjusted based on factors such as age, gender, physical fitness level or disability. For instance, a movement by a faster person could be realistic, but not for a slower person. A specific example is provided in connection with FIG. 9*d*.

FIG. 9*b* depicts an example of an application responding to inputs as set forth in step 506 of FIG. 5, where a wait time is imposed before concluding that a new person or group intends to interact with an application. At decision step 902, a determination is made as to whether a new person or group has been detected in the field of view, e.g., while one or more other people or groups are currently interacting with an application. In such cases, an erroneous conclusion might be made that the new person or group desires to interact with the application. For example, the new person or group may be simply walking through the field of view and have no desire to interact with the application. Thus, if the application were to display one or more new avatars on a display and begin moving the avatars based on movement of the new person or group, the experience of the one or more other people or groups who are currently interacting with an application would be interrupted. Even if no one was currently interacting with the application, and the application was in an inactive mode, it would be undesirable to activate the application and provide audio and video outputs when a new person or group walks through the field of view and does not intend to interact with the application. This is a type of erroneous output. Another scenario involves the tracking erroneously detecting at least one new person's body in the field of view.

Thus, the predetermined scenario which poses a risk of causing the application to provide an erroneous output on the display can involve the tracking erroneously identifying at least one new person's body in the field of view, and/or the application erroneously concluding that the at least one new person in the field of view is interacting with the application.

Step 903 determines a wait time adaptively based on a distance of the first detected location of the new person or group from the edge of the field of view. Thus, based on the results from the tracking being consistent with the predetermined scenario, the risk of the application providing an erroneous output is reduced by imposing a minimum wait time before the application concludes that the at least one new person intends to interact with the application. Moreover, the minimum wait time can be a function of a distance of a first detected location of the at least one new person's body in the field of view from an edge of the field of view. The minimum wait time can be longer when the distance is greater, and shorter when the distance is less. For instance, it is unlikely for a new person or group to be first detected at a location in the field of view which is at a central region, relatively far from the edges of the field of view, since typically a person would enter the field of view from an edge region, such as when entering the field of view from another room or from a location in a room which is outside the field of view. It is possible but unlikely, e.g., that a person is obscured by an object and then suddenly first appears in the center of the field of view. A fixed wait time could also be used.

At decision step 904, if the wait time has passed, step 905 concludes that the new person or group intends to interact with application. At this time, interaction is allowed, and a new avatar may be displayed and activated at step 906, for instance, to allow such interaction. Thus, the application displays a new avatar in the virtual space on the display to represent the at least one new person upon completion of the minimum wait time.

FIG. 9c depicts an example of an application responding to inputs as set forth in step 506 of FIG. 5, where a wait time is imposed before concluding that a new person or group is no longer interacting with an application. Decision step 907 determines if a person or group is no longer detected in the field of view. In some cases, a person or group that is currently interacting with an application may no longer be detected in the field of view. For example, they may remain in the field of view but no longer be detected by the depth camera system, e.g., due to a failure of the depth camera system or due to occlusion in the field of view. Or, they may leave the field of view briefly, intending to return and continue interacting with the application. In such cases, the application may erroneously conclude that the person or group intends to no longer interact with the application, and may deactivate an avatar, for instance, and transition to an inactive mode in which no audio or visual output is provided, or a standby output such as where a screen saver is provided.

A predetermined scenario which poses a risk of causing the application to provide an erroneous output thus includes the tracking failing to detect at least one person's body in the field of view, and the application erroneously concluding that the at least one person is no longer interacting with the application.

If decision step 907 is true, step 908 is performed to adaptively determine a wait time based on a distance of a last detected location of the person or group from an edge of the field of view. Thus, based on the results from the tracking being consistent with the predetermined scenario, the risk of the application providing an erroneous output is reduced by imposing a minimum wait time before the application concludes that the person or group is no longer interacting with the application. Moreover, the minimum wait time is a function of a distance of a last detected location of the person or group in the field of view from an edge of the field of view, and the minimum wait time is longer when the distance is greater, and shorter when the distance is less. For instance, it is unlikely for a person or group to be last detected at a location in the field of view which is at a central region, relatively far from the edges of the field of view, since typically a person would leave the field of view from an edge region, such as when leaving the field of view to go to another room or to a location in a room which is outside the field of view. It is possible but unlikely, e.g., that a person is obscured by an object and suddenly disappears in the center of the field of view. A fixed wait time could also be used.

At decision step 909, if the wait time has passed, step 910 concludes that the person or group intends to stop interacting with application. At this time, interaction is stopped, and an avatar may be deactivated at step 911, for instance. Thus, the application deactivates the avatar in the virtual space to represent that at least one person is no longer interacting with the application, upon completion of the minimum wait time.

FIG. 9d depicts an example display and physical space based on FIGS. 9b and 9c, where movement and location of a person in physical space is evaluated. A display 912 depicts a virtual space in which an avatar 914 stands on a road 913. A depth camera system 920 includes a representative sensor 918, and a physical space 926 is provided in the field of view of the depth camera system, where lines 922 and 924 are boundaries of the field of view. A bounding cylinder 928 with central point 930 represents a person (or group). The central point 930 is a distance d2 from the boundary 922, e.g., a shortest distance to the boundary 922. A shortest distance from the bounding cylinder 928 to the boundary 922 could also be determined. A bounding cylinder 938 with central point 940 represents an erroneous detection of the person or group. The central point 940 is a distance d1 from the central point 930. A shortest distance between the bounding cylinders 928 and 938 could also be determined.

In FIG. 9a, discussed previously, a determination was made as to whether a person or group moves a realistic amount in a certain amount of time. Here, the distance d1 may represent an unrealistic amount to move in a short amount of time, such as less than one second, where the physical space 926 is typically the size of a living room or recreational room which might be in a person's home. On the display 912, avatar 914 is positioned based on the location of the central point 930, and avatar 915 is positioned based on the location of the central point 940, at a substantially different portion of the display 912. It can be seen that if the location of a person was erroneously determined to move from the central point 930 to the central point 940, the avatar 915 would be displayed instead of the avatar 914, resulting in a discontinuous experience.

In FIG. 9b, discussed previously, a determination was made as to whether detection of a new person or group is erroneous. Assume that central point 930 represents the first detected location of the person or group. In this case, a wait time can be implemented in decision step 904 as a function of the distance d2, the distance of the first detected location from the edge 922 of the field of view.

In FIG. 9c, discussed previously, a determination was made as to whether detection of a person or group leaving the field of view is erroneous. Assume that central point 930 represents the last detected location of the person or group. In this case, a wait time can be implemented in decision step 909 as a function of the distance d2, the distance of the last detected location from the edge 922 of the field of view.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method in a motion capture system, the method comprising:
    based on frames of image data of a field of view of a depth camera system, tracking a person's body in the field of view, the tracking provides results for use by an application in providing an avatar in a virtual space on a display, such that the avatar represents the person's body and is controlled by movement of the person's body, the tracking comprises detecting the person's body at a last detected location in the field of view before determining that the person's body is no longer detected in the field of view, the last detected location is in a central region of the field of view, relatively far from edges of the field of view; and
    imposing a wait time before the application concludes that the person no longer intends to interact with the application, where the wait time is a function of a distance of the last detected location from one of the edges of the field of view, and the wait time is longer when the distance is greater.

2. The processor-implemented method of claim 1, wherein:
    the person's body is no longer detected in the field of view due to the tracking failing to detect the person's body in the field of view while the person is interacting with the application.

3. The processor-implemented method of claim 1, wherein:
    the application deactivates the avatar in the virtual space to represent that the person is no longer interacting with the application, upon completion of the wait time.

4. The processor-implemented method of claim 1, wherein:
    the tracking comprises determining a representative point location of the person's body in the field of view; and
    the distance is a distance between the representative point location of the person's body in the field of view and the one of the edges of the field of view.

5. The processor-implemented method of claim 4, wherein:
    the representative point location of the person's body in the field of view is determined from a skeletal model of the person's body in the field of view.

6. The processor-implemented method of claim 4, wherein:
    the representative point location of the person's body in the field of view is determined from a bounding shape which encompasses the person's body.

7. The processor-implemented method of claim 6, wherein:
    the representative point location of the person's body in the field of view is a central point of the bounding shape.

8. A motion capture system, comprising:
    a display;
    a storage device comprising instructions, the instructions to:
        based on frames of image data of a field of view of a depth camera system, detect a new person's body in the field of view at a first detected location in the field of view, the first detected location is in a central region of the field of view, relatively far from edges of the field of view;
        impose a wait time before an application concludes that the new person is interacting with the application, where the wait time is a function of a distance of the first detected location from one of the edges of the field of view, and the wait time is longer when the distance is greater; and
        upon completion of the wait time, allow the new person to interact with the application by providing an avatar in a virtual space on the display, such that the avatar represents the new person's body and is controlled by movement of the new person's body; and
    a processor operable to execute the instructions.

9. The motion capture system of claim 8, wherein:
    the new person's body is detected in the field of view at the first detected location while one or more other people are currently interacting with the application; and
    an interruption to the one or more other people currently interacting with the application is avoided during the wait time.

10. The motion capture system of claim 8, wherein:
    the new person's body is detected in the field of view at the first detected location while the application is in an inactive mode and no other people are currently interacting with the application; and
    an activation of the application is avoided during the wait time.

11. The motion capture system of claim 8, wherein:
    the new person's body is no longer detected in the field of view due to a failure to detect the new person's body in the field of view while the new person is interacting with the application.

12. The motion capture system of claim 8, wherein:
    the distance is a distance between a representative point location of the new person's body in the field of view and the one of the edges of the field of view; and
    the representative point location of the new person's body in the field of view is determined from a skeletal model of the new person's body in the field of view or from a bounding shape which encompasses the new person's body.

* * * * *